(12) United States Patent
Sundaravaradhan et al.

(10) Patent No.: US 12,513,572 B2
(45) Date of Patent: Dec. 30, 2025

(54) SYSTEMS FOR AND METHODS OF DYNAMIC SUBBAND OPERATION

(71) Applicant: Avago Technologies International Sales Pte. Limited, Singapore (SG)

(72) Inventors: Srinath Puducheri Sundaravaradhan, San Jose, CA (US); Matthew J. Fischer, San Jose, CA (US); Sindhu Verma, Bangalore (IN); Shubhodeep Adhikari, Bangalore (IN); George D. Kondylis, San Jose, CA (US); Zhou Lan, San Jose, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 412 days.

(21) Appl. No.: 18/099,033

(22) Filed: Jan. 19, 2023

(65) Prior Publication Data
US 2023/0239743 A1 Jul. 27, 2023

(30) Foreign Application Priority Data
Jan. 21, 2022 (IN) .............................. 202241003532

(51) Int. Cl.
*H04W 28/20* (2009.01)
*H04W 28/02* (2009.01)
*H04W 36/06* (2009.01)
*H04W 72/0453* (2023.01)
*H04W 84/12* (2009.01)

(52) U.S. Cl.
CPC ....... *H04W 28/20* (2013.01); *H04W 28/0268* (2013.01)

(58) Field of Classification Search
CPC . H04W 28/20; H04W 28/0268; H04W 84/12; H04W 36/06; H04W 72/0453
See application file for complete search history.

(56) References Cited

U.S. PATENT DOCUMENTS

| | | | | |
|---|---|---|---|---|
| 2012/0166671 | A1* | 6/2012 | Qi | H04L 45/64 709/236 |
| 2017/0346608 | A1* | 11/2017 | Li | H04W 74/08 |
| 2021/0227513 | A1* | 7/2021 | Takeda | H04L 5/0053 |
| 2023/0284267 | A1* | 9/2023 | Fehrenbach | H04W 74/0808 370/329 |
| 2024/0340120 | A1* | 10/2024 | Liu | H04L 1/1854 |

* cited by examiner

*Primary Examiner* — Harry H Kim
(74) *Attorney, Agent, or Firm* — Foley & Lardner LLP

(57) ABSTRACT

Systems, devices, methods, and computer-readable storage media of channel switching. One device for channel switching includes a memory and at least one processor. The at least one processor is configured to communicatively couple with one or more client devices, using one of a primary bandwidth channel or a secondary bandwidth channel and transmit a first trigger on at least the primary bandwidth channel to at least a first client device of the one or more client devices based on at least one of (i) a bandwidth availability (ii) a quality of service parameter, or (iii) a secondary bandwidth switching capability, wherein the first client device switches from the primary bandwidth channel to the secondary bandwidth channel in response to the first trigger.

20 Claims, 8 Drawing Sheets

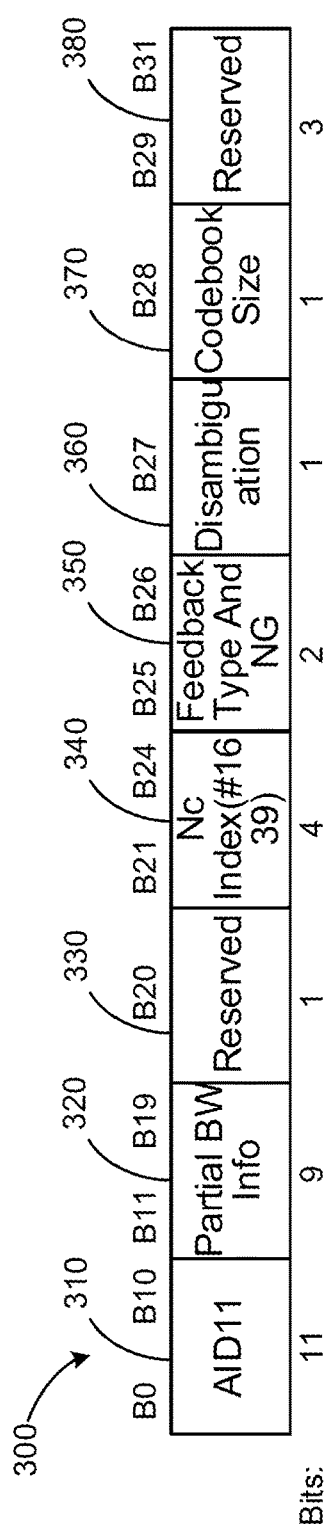

| | B0 | B10 | B11 | B19 | B20 | B21 | B24 | B25 | B26 | B27 | B28 | B29 | B31 |
|---|---|---|---|---|---|---|---|---|---|---|---|---|---|
| | AID11 | | Partial BW Info | | Reserved | Nc Index (#16 39) | | Feedback Type And NG | | Disambiguation | Codebook Size | Reserved | |
| Bits: | 11 | | 9 | | 1 | 4 | | 2 | | 1 | 1 | 3 | |

| AID subfield | Description | NDP Announcement frame variant applicability |
|---|---|---|
| 0 | STA Info field is addressed to the associated AP or mesh AP or IBSS STA (#5538). | Applicable to any variant |
| 1–2007 | STA Info field is addressed to an associated STA whose AID is equal to the value in the AID11 subfield if the NDP Announcement frame is not a Ranging variant. STA Info field is addressed to an unassociated STA or an associated STA whose RSID/AID is equal to the value in the RSID11/AID11 subfield if the NDP Announcement frame is a Ranging variant. The value 2007 is reserved for EHT variant(#5789). | Applicable to any variant |
| 2008–2042 | Reserved | Not applicable to any variant |

FIG. 3

SYSTEMS FOR AND METHODS OF DYNAMIC SUBBAND OPERATION

CROSS-REFERENCE TO RELATED APPLICATION AND CLAIM OF PRIORITY

This application claims priority to and the benefit of Indian Patent Application No. 202241003532, filed on Jan. 21, 2021, which is incorporated herein by reference in its entirety.

BACKGROUND

The present disclosure relates to the field of wireless network communication. In a wireless network environment, devices can communicate using different bandwidths on the wireless network environment.

BRIEF DESCRIPTION OF THE DRAWINGS

FIG. 3 is a block diagram of a field including subfields for use in the operations illustrated in FIGS. 2A-2B, according to some embodiments.

Figure 1A:
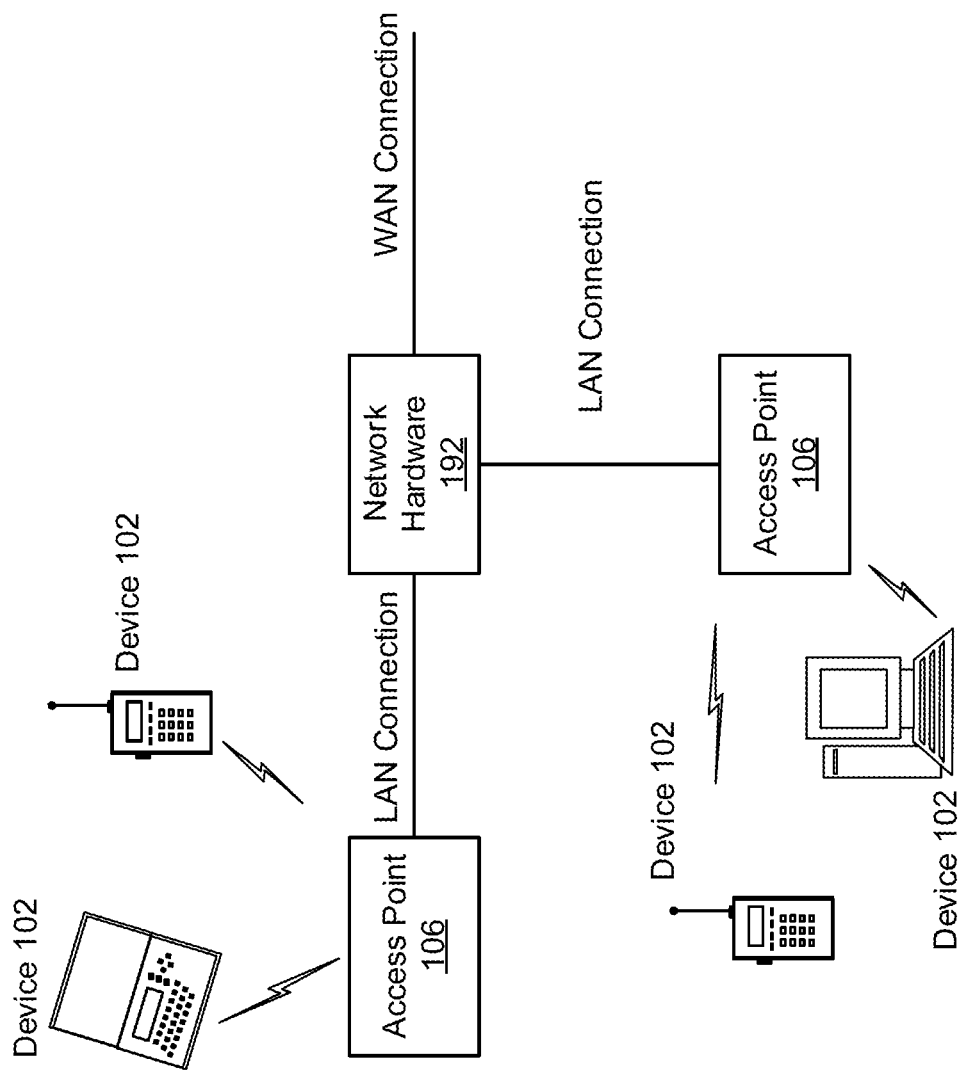
FIG. 1A is a block diagram illustrating an example embodiment of a network environment including one or more access points in communication with one or more devices or stations, according to some embodiments.

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements. The details of various embodiments of the methods and systems are set forth in the accompanying drawings and the description below.

DETAILED DESCRIPTION

The following IEEE standard(s), including any draft versions of such standard(s), are hereby incorporated herein by reference in their entirety and are made part of the present disclosure for all purposes: WiFi Alliance standards and IEEE 802.11 standards including but not limited to IEEE 802.11a™, IEEE 802.11b™, IEEE 802.11g™, IEEE P802.11n™; and IEEE P802.11ac™ standards. Although this disclosure can reference aspects of these standard(s), the disclosure is in no way limited by these standard(s).

Referring generally to the FIGS. 2A-4, systems and methods relate generally to wireless network communications. An access point (AP) may be a device that communicatively couples one or more "non-AP" devices (e.g., a client device) to a network. More specifically, an AP may enable non-AP devices to connect and communicate with a network. In some embodiments an AP may be a "wireless access point" (WAP) configured to enable wireless communication between non-AP devices. The term "communicatively coupling" may refer to a condition of being in direct or indirect communication with one or more devices over wireless or wired medium. For example, two or more devices, components, or elements (e.g., an AP and a client device) can be communicatively coupled so that communications can occur between the devices. Communicatively coupling an access point (AP) with one or more client devices may refer to an AP and at least one client device reaching a condition of being in direct or indirect communication with one or more devices over wireless or wired medium in some embodiments.

Operating bandwidth may refer to a range of communication frequencies. Accordingly, the operating bandwidth may include maximum and/or minimum values (e.g., a minimum operating bandwidth, a maximum operating bandwidth). More specifically an operating bandwidth of a particular device refers to a range of frequencies that the particular device may use for wireless network communication. For example, an AP and/or a non-AP device may have an operating bandwidth range that includes a maximum operating bandwidth and/or a minimum operating bandwidth. Values for maximum and minimum operating bandwidths are often defined in communication standards.

In some embodiments, a wireless network communication standard (e.g., such as 802.11be or another protocol) can support 320 megahertz (MHz) as the maximum bandwidth of operation on any one link. Typical 802.11be access points (APs) may support 320 MHz bandwidth of operation. However, due to cost, hardware limitations, resources, and other reasons, most of the 802.11be non-APs, such as a client device, may support a smaller bandwidth (e.g., 160 MHz or lower) as the maximum bandwidth of operation. Such mismatch in the capabilities between the AP and the non-AP results in wastage of bandwidth capabilities of the AP whenever the AP interacts with smaller bandwidth non-APs. In various embodiments, similar problem exists in respect of the maximum number of streams an AP can support vs. the maximum number of streams a non-AP can support. In some embodiments, systems and methods advantageously enable the AP to aggregate the streams of multiple non-APs spatially using MU-MIMO (multi-user, multiple-input, multiple output).

Generally, Dynamic Subband Operation (DSO) can enable an AP to utilize a secondary channel bandwidth when it wins channel access in a dynamic matter on a per-transmit opportunity basis. The AP can dynamically decide whether to allocate non-APs on the primary channel or secondary channel depending on bandwidth availability and quality of service (QoS) parameters or requirements. In some embodiments, the allocation can be based on a first protocol (described as "Protocol 1" below described with reference to FIG. 2B) or a second protocol (described as "Protocol 2" below described with reference to FIG. 2C).

Bandwidth availability refers to an amount of information that can be sent or received usually per a unit of time under current conditions. Bandwidth availability can be provided on a per channel basis, can consider reliability of the communication completing, and is usually subject to conditions on the communication medium (e.g., traffic, interference, etc.). A QOS parameter or requirement may include a performance (e.g., latency time), availability (e.g., network uptime, network downtime), and/or reliability (e.g., unplanned network downtime) of network communications enabled by the APs. For example, the performance, availability, and/or reliability metrics may measure network speeds, network range, network uptime, planned network downtime, unplanned network downtime, etc. In some embodiments, the dynamic allocation assists in the alignment of the presence of the narrower bandwidth non-APs on the secondary channel with the availability of the secondary channel bandwidth. In some embodiments, the dynamic allocation also results in better resource utilization and system performance compared to an HE SST-based (High-Efficiency Subchannel Selective Transmission) solution.

In various embodiments, DSO allows a wider bandwidth AP to achieve a system performance equal to that supported by its wider bandwidth even when operating with non-APs that have narrower bandwidth. For example, a 320 megahertz (320 MHz) AP operating with 160 MHz non-APs can achieve system performance of 320 MHz with DSO and therefore, twice that achievable without DSO. The same holds true for a 160 MHz AP operating with 80 MHz non-APs.

In some embodiments, DSO gains are proportional to the ratio of the bandwidth capability of the AP to that of the non-APs in case of scenarios where power spectral density (PSD) is limited (e.g., when power headroom is available). DSO gains in non-PSD-limited scenarios (e.g., when power headroom is not available), depend on the modulation coding scheme (MCS) being used. In most cases, a 3 decibel (dB) reduction in power being transmitted on one half of the bandwidth in order to transmit the same power in the other, will result in a drop in MCS by 1 level (e.g., a 256-bit Quadrature Amplitude Modulation (QAM) with a 5/6 coding rate becomes a 256-QAM with a 3/4 coding rate). Furthermore, the overheads associated with DSO, due to subband switch indication and latency amount to at most an upper-bound run-time of 100 microseconds (μs). These overheads are negligible compared to the gains achievable with DSO, particularly when the transmit opportunity (TXOP) spans a few milliseconds (ms).

Some embodiments relate a device for channel switching, including a memory and at least one processor configured to communicatively couple with one or more client devices, using one of a primary bandwidth channel or a secondary bandwidth channel, and transmit a first trigger on at least the primary bandwidth channel to at least a first client device of the one or more client devices based on at least one of (i) a bandwidth availability (ii) a quality of service parameter, or (iii) a secondary bandwidth switching capability, wherein the first client device switches from the primary bandwidth channel to the secondary bandwidth channel in response to the first trigger.

Alternatively, some embodiments relate to a device for channel switching, including a memory and at least one processor configured to communicatively couple with one or more client devices, using one of a primary bandwidth channel or a secondary bandwidth channel, transmit a first trigger on the primary bandwidth channel to a first client device of the one or more client devices based on at least one of (i) a bandwidth availability or (ii) a quality of service parameter, wherein the first client device switches from the primary bandwidth channel to the secondary bandwidth channel in response to the first trigger, and transmit a second trigger on the primary bandwidth channel to a second client device of the one or more client devices based on at least one of (i) the bandwidth availability or (ii) the quality of service parameter, wherein the second client device remains on the primary bandwidth channel in response to the second trigger.

In some embodiments, the at least one processor is further configured to transmit a second trigger on at least the primary bandwidth channel to at least a second client device of the one or more client devices based on at least one of (i) the bandwidth availability (ii) the quality of service parameter, or (iii) the secondary bandwidth switching capability, wherein the second client device remains on the primary bandwidth channel in response to the second trigger, wherein the first trigger and the second trigger are contained in a single transmission (i.e., Protocol 1).

Additionally for Protocol 1, in some embodiments, the first trigger includes an indication of a first channel location for subsequent communication, and wherein the first channel location is different from a second channel location on which at least the first client device of the one or more client devices is currently operating when it receives the indication.

Additionally for Protocol 1, in some embodiments, the first channel location is a first resource unit (RU) allocation in the secondary bandwidth channel and the second channel location is a second RU allocation in the primary bandwidth channel, and wherein the first trigger and the second trigger enable the subsequent communication.

Additionally for Protocol 1, in some embodiments, the first client device transmits a first response on at least the secondary bandwidth channel in response to receiving a first message in the first trigger, and wherein the second client device transmits a second response on at least the primary bandwidth channel in response to receiving a second message in the second trigger.

Additionally for Protocol 1, in some embodiments, at least one of the one or more client devices remain on the primary bandwidth channel and responds to the second trigger, and wherein at least one of the one or more client devices switch to the secondary bandwidth channel and responds to the first trigger, and wherein the responses to the first trigger and the second trigger occur during a transmit opportunity, and wherein following the responses and during the transmit opportunity the first client device remains on the primary bandwidth channel and the second client device remains on the secondary bandwidth channel.

Additionally for Protocol 1, in some embodiments, the first trigger indicates a start of a transmit opportunity, and wherein during the transmit opportunity the first client device remains on the secondary bandwidth channel and the second client device remains on the primary bandwidth channel In some embodiments, the at least one processor is further configured to transmit a second trigger on at least the secondary bandwidth channel to at least the first client device and on at least the primary bandwidth channel to at least a second client device of the one or more client devices in response to transmitting the first trigger, wherein the second client device remains on the primary bandwidth channel in response to the second trigger, and wherein the separate transmissions is a second protocol (i.e., Protocol 2) (e.g., the first trigger and the second trigger are separate transmissions).

Additionally for Protocol 2, in some embodiments, the first trigger includes an indication of a first channel location for subsequent communication, and wherein the first channel location is different from a second channel location on which at least the first client device of the one or more client devices is currently operating when it receives the indication.

Additionally for Protocol 2, in some embodiments, the first channel location is a first resource unit (RU) allocation in the secondary bandwidth channel and the second channel location is a second RU allocation in the primary bandwidth channel, and wherein the second trigger enables the subsequent communication.

Additionally for Protocol 2, in some embodiments, the at least one processor transmits the second trigger on the secondary bandwidth channel to the first client device, and wherein the second trigger includes instructions for the subsequent communication by the first client device and the second client device, and wherein the second trigger requests responses from the first client device on the secondary bandwidth channel and the second client device on the primary bandwidth channel.

Additionally for Protocol 2, in some embodiments, the first client device switches from the primary bandwidth channel to the secondary bandwidth channel after the first trigger, and wherein the first trigger is a start of a transmit opportunity, and wherein the second trigger requests responses including the subsequent communication from the first client device on the secondary bandwidth channel and the second client device on the primary bandwidth channel, and wherein during the transmit opportunity the first client device remains on the secondary bandwidth channel and the second client device remains on the primary bandwidth channel In some embodiments, the first client device is a station (STA) device communicating via a networking protocol, and wherein the STA device supports a maximum operating bandwidth, and wherein the STA device operates at a lower bandwidth than a maximum device operating bandwidth, and wherein the STA device switches from the primary bandwidth channel to the secondary bandwidth channel, and wherein a plurality of transmissions on each of the primary bandwidth channel and the secondary bandwidth channel are within short interframe spaces (SIFSs) of each other.

In some embodiments, the first trigger or the second trigger is identified by a 1-bit indication, and wherein the 1-bit indication is a field within a frame, and wherein the first trigger or the second trigger includes resource unit (RU) allocations that lie in the primary bandwidth channel or the secondary bandwidth channel, and wherein the at least one processor is further configured to determine the bandwidth availability using a first network traffic parameter for the first client device.

In some embodiments, wherein channel switching gains are proportional to a ratio of a device bandwidth capability to a non-device bandwidth capability, and wherein the channel switching enables aggregation of streams of multiple non-devices spatially using multi-user multiple-input and multiple-output (MU-MIMO), wherein the device is an access point (AP) and the non-device is a non-AP, and wherein during a transmit opportunity following the first client device switching from the primary bandwidth channel to the secondary bandwidth channel in response to the first trigger, any subsequent transmissions from the first client device occurs in response to another trigger or request from the at least one processor.

Some embodiments relate to a device including a network interface configured to establish connections with one or more client devices, a channel switching unit configured to communicatively couple with one or more client devices, using one of a primary bandwidth channel or a secondary bandwidth channel, and a transmitter configured to transmit a first trigger on at least the primary bandwidth channel to at least a first client device of the one or more client devices based on at least one of (i) a bandwidth availability (ii) a quality of service parameter, or (iii) a secondary bandwidth switching capability, wherein the first client device switches from the primary bandwidth channel to the secondary bandwidth channel in response to the first trigger Alternatively, some embodiments relate to a device including a network interface configured to establish connections with one or more client devices, a channel switching unit configured to communicatively couple with one or more client devices, using one of a primary bandwidth channel or a secondary bandwidth channel, and a transmitter (or transmitter processing circuit) configured to transmit a first trigger on the primary bandwidth channel to a first subset of the one or more client devices based on at least one of (i) a bandwidth availability or (ii) a quality of service parameter, wherein the first subset of the one or more client devices switches from the primary bandwidth channel to the secondary bandwidth channel in response to the first trigger, transmit a second trigger on the primary bandwidth channel to a second subset of the one or more client devices based on at least one of (i) the bandwidth availability or (ii) the quality of service parameter, wherein the second subset of the one or more client devices remains on the primary bandwidth channel in response to the second trigger, and wherein at least one client device of the first subset of the one or more client devices is a client device of the second subset of the one or more client devices.

In some embodiments, the transmitter is further configured to transmit a second trigger on at least the primary bandwidth channel to at least a second client device of the one or more client devices based on at least one of (i) the bandwidth availability (ii) the quality of service parameter, or (iii) the secondary bandwidth switching capability, wherein the second client device remains on the primary bandwidth channel in response to the second trigger, wherein the first trigger and the second trigger are contained in a single transmission.

In some embodiments, the first trigger and the second trigger are contained in a single transmission, and wherein the single transmission is a first protocol, and wherein the first trigger includes an indication of a first channel location for subsequent communication, and wherein the first channel location is different from a second channel location on which at least one of the one or more client devices is currently operating when it receives the indication.

In some embodiments, the transmitter is further configured to transmit a second trigger on at least the secondary bandwidth channel to at least the first client device and on at least the primary bandwidth channel to at least a second client device of the one or more client devices in response to transmitting the first trigger, wherein the second client device remains on the primary bandwidth channel in response to the second trigger, wherein the first trigger and the second trigger are separate transmissions.

In some embodiments, the first trigger and the second trigger are separate transmissions by the transmitter, and wherein the separate transmissions is a second protocol, and wherein the transmitter transmits the second trigger on the primary bandwidth channel and the secondary bandwidth channel, and wherein the first trigger includes an indication of a first channel location for subsequent communication, and wherein the first channel location is different from a second channel location on which at least one of the one or more client devices is currently operating when it receives the indication.

Some embodiments relate to a method of channel switching including communicatively coupling, by an access point (AP), with one or more client devices, using one of a primary bandwidth channel or a secondary bandwidth channel, and transmitting, by the AP, a first trigger on at least the primary bandwidth channel to at least a first client device of the one or more client devices based on at least one of (i) a bandwidth availability (ii) a quality of service parameter, or (iii) a secondary bandwidth switching capability, wherein the first client device switches from the primary bandwidth channel to the secondary bandwidth channel in response to the first trigger.

Alternatively, some embodiments relate to a method of channel switching including communicatively coupling, by an access point (AP), with one or more client devices, using one of a primary bandwidth channel or a secondary bandwidth channel, transmitting, by the AP, a first trigger on the primary bandwidth channel to a first client device of the one or more client devices based on at least one of (i) a bandwidth availability or (ii) a quality of service parameter, wherein the first client device switches from the primary bandwidth channel to the secondary bandwidth channel in response to the first trigger, and transmitting, by the AP, a second trigger on the primary bandwidth channel to a second client device of the one or more client devices based on at least one of (i) the bandwidth availability or (ii) the quality of service parameter, wherein the second client device remains on the primary bandwidth channel in response to the second trigger.

In some embodiments, the method further includes transmitting, by the AP, a second trigger on at least the primary bandwidth channel to at least a second client device of the one or more client devices based on at least one of (i) the bandwidth availability (ii) the quality of service parameter, or (iii) the secondary bandwidth switching capability, wherein the second client device remains on the primary bandwidth channel in response to the second trigger, wherein the first trigger and the second trigger are contained in a single transmission.

In some embodiments, the first trigger and the second trigger are contained in a single transmission, and wherein the single transmission is a first protocol, and wherein the first trigger includes an indication of a first channel location for subsequent communication, and wherein the first channel location is different from a second channel location on which at least the first client device of the one or more client devices is currently operating when it receives the indication.

In some embodiments, the method further includes transmitting, by the AP, a second trigger on at least the secondary bandwidth channel to at least the first client device and on at least the primary bandwidth channel to at least a second client device of the one or more client devices in response to transmitting the first trigger, wherein the second client device remains on the primary bandwidth channel in response to the second trigger, wherein the first trigger and the second trigger are separate transmissions.

In some embodiments, the first trigger and the second trigger are separate transmissions by the AP, and wherein the separate transmissions is a second protocol, and wherein the AP transmits the second trigger on the primary bandwidth channel and the secondary bandwidth channel, and wherein the first trigger includes an indication of a first channel location for subsequent communication, and wherein the first channel location is different from a second channel location on which at least the first client device of the one or more client devices is currently operating when it receives the indication.

A primary bandwidth channel may refer to a channel in a bandwidth of a larger channel that includes a secondary bandwidth channel. In some embodiments, the primary channel is part of a wide channel that also includes a secondary channel. In some embodiments, the primary channel uses an upper half or lower half of the bandwidth of the wide channel, and the secondary channel uses the remaining half of the bandwidth of the wide channel. In some embodiments, the bandwidths of the primary bandwidth channel and the secondary bandwidth channel are not equal. In some embodiments, the secondary channel has less bandwidth than the primary channel or the primary channel has less bandwidth than the secondary channel. In some embodiments, multiple secondary channels can be provided in the wide channel with one primary channel. In some embodiments, the primary channel is used for client devices that only support a smaller channel bandwidth (e.g., 20 MHz) while the primary channel and the secondary channel can be used for client devices that support wide channel capabilities. The terms primary and secondary do not connote a specific priority and can be interchanged with first and second and vice versa in some embodiments. In various embodiments, multiple secondary channels may be available (e.g., secondary channel 1, secondary channel 2, secondary channel 3) such that switching from a primary bandwidth channel to a secondary bandwidth channel can be to one of many secondary channels. For example, client device 1 one may move from primary channel to secondary channel 1 and client device 2 may move from primary channel to secondary channel 2.

A "trigger" (e.g., the first trigger, the second trigger, the third trigger, etc.) may refer to a signal (e.g., a wireless signal, a wired signal) that enables communication of data. The communication of data can include, but are not limited to, instructions to switch a non-AP device from a first bandwidth channel to a second bandwidth channel, and/or instructions to instruct all or some non-AP devices to transmit. In some embodiments, the multiple triggers may be sent that trigger non-AP devices to switch bandwidth channels and/or enable a subsequent communication (without switching a bandwidth channel). In general, when the APs transmit two triggers separately in succession, the two triggers could address overlapping sets of clients (i.e., not mutually exclusive). For example, each of a plurality of subset of client devices can include a client device from another subset, such that when a trigger is sent to a first subset of client devices and a second subset of client device, a client device may receive two triggers if the client device is in both subsets. In some embodiments, the data included with the "trigger" includes instructions that cause a receiving device (e.g., a non-AP device, an AP device, etc.) to control the operation of the receiving device according to the instructions (e.g., adjusting operation, not adjusting operation, etc.). In some embodiments, the data included to control an operation can be sent in a separate trigger that is different form a trigger to switch a bandwidth channel (i.e., Protocol 2). However, in some embodiments, the data included to control an operation can be sent in the same trigger that switches a bandwidth channel (i.e., Protocol 1). For example, and as briefly described above, a "first trigger" may cause a first client device to switch from the primary bandwidth channel to the secondary bandwidth channel. In some embodiments, the trigger can be provided in a data transmission, such as in a data frame (e.g., a management frame) or a sequence of frames. In some embodiments, the trigger is one or more bits in a field of a frame or other data container. To allocate the one or more client devices to one of a primary bandwidth channel or a secondary bandwidth channel may refer to the assigning or reserving of a primary bandwidth channel or secondary bandwidth channel for one or more client devices in some embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired, or wireless, and that the specification is not intended to be limiting in this respect.

For purposes of reading the description of the various embodiments below, the following descriptions of the sections of the specification and their respective contents may be helpful: Section A, describing example embodiments of systems and methods for providing transmission bandwidth improvements for channel bonding (e.g., in DVB-S2X), and Section B, describing an example network environment and computing environment which may be useful for practicing embodiments described herein.

A. Providing Dynamic Subband Operation

A wireless communication access point (AP) 106 (exemplary APs(s) 106 are shown in FIG. 1A) enabled for network communication (e.g., 802.11be) may utilize a dynamic subband operation, also referred to herein as "bandwidth aggregation". Components of AP 106 can be provided as one or more integrated circuits (IC) in an IC package. The IC package can by a single chip package or a multichip module. An AP 106 (e.g., 802.11be AP) may have a support 320 MHz as the maximum bandwidth of operation on any one link. Non-AP devices (shown as device(s) 102 in FIG. 1A), such as a client device, may support a bandwidth less than 320 MHz. Accordingly, an AP 106 may utilize a channel switching protocol to improve network traffic (e.g., uplink traffic and downlink traffic) from the AP 106 to the non-AP(s) 102. That is, non-AP(s) 102 may be split between different parts of the 320 MHz spectrum, on different channels. The channel switch protocol includes moving between primary and secondary channels. The systems and methods described herein enable an AP 106 to dynamically switch non-AP devices 102 between channels based on, for example actual network traffic and/or expected network traffic. It should be understood switching, by an AP 106, non-AP(s) 102 between channels based on other operating conditions and/or using other protocols, frames, etc. falls within the scope of this application. A "frame" refers to a digital data transmission unit. For example, a frame may be a container for a single network packet. A "frame sequence" is a set of frames that are sent in an order. The frame sequence may include bits that indicate to a receiving device the beginning and/or end of payload data or an order of the frames. In some embodiments, a frame sequence is transmitted or received out of order and reordered at the receiving device.

Initial Conditions

In some embodiments, an AP 106 may operate on one or more links. For example, an AP 106 that operates on more than one link is an AP Multi Link Device (AP MLD). An AP MLD operating on two links typically utilizes one 5 gigahertz (GHz) link and one 6 GHz link. In some embodiments, a 5 GHz link is 160 MHz and narrower in bandwidth. In some embodiments, a 6 GHz link is up to 320 MHz in bandwidth. In some embodiments, the AP MLD may, optionally, have an additional 2.4 GHz link. In some embodiments, the 2.4 GHz link has a narrower bandwidth than the 5 and 6 GHz links.

A station (STA) device is a device communicating via a networking protocol (e.g., 802.11). In some embodiments, the STA device is a client (e.g., non-AP device 102). In other embodiments, the STA device is an AP device, such as the AP 106. STA devices associated with the AP 106 may operate with a bandwidth that is narrower than the AP operating bandwidth (also known as the base substation system (BSS) operating bandwidth). For STA MLD associated with an AP MLD, the bandwidth of each associated link may be the same width or narrower than the bandwidth of the AP 106 on that link. For a STA MLD, the operation on each link of the MLD is similar to the operation of an individual STA on the link. A client device may refer to any device for communicating in a network of any type and includes but is not limited to a fixed, portable, or mobile laptop, desktop personal computer, personal digital assistant, access point, work station, wearable device, smart phone, or Wi-Fi phone. A client device can be a STA in some embodiments.

An STA operating on a link with an AP 106 where the STA operating bandwidth is narrower than the AP bandwidth on that link may be configured to switch between Primary and Secondary segments of the AP operating BW bandwidth. For example, a 320 MHz operating bandwidth of an AP may be divided into a 160 MHz primary (160P) sub-channel and a 160 MHz Secondary (160S) subchannel. It should be understood that other bandwidth values are possible. For example, a 160 MHz operating channel may be divided into 4×40 MHz subchannels, a first subchannel of which is the primary and the others are secondary. In some embodiments, the width of the subchannels can be 20 MHz or 40 MHz or 80 MHz or 160 MHz, etc., while the width of the operating channel can be 40 MHz, 80 MHz, 160 MHz, 320 MHz, etc. In any of the embodiments described herein the subchannels are broadband wireless access subchannels.

In some embodiments, STAs associated with an AP 106 normally operate on a portion of the entire operating channel which includes the primary 20 MHz subchannel that is designated by the AP 106 as the primary 20 MHz subchannel. When, for example, two 160 MHz STAs are associated with an AP 106 operating a 320 MHz channel, those two STAs will operate on the same 160 MHz subchannel of the 320 MHz operating channel. Because the 20 MHz primary exists in only one location and both STAs must include that 20 MHz primary channel in a respective operating width. A STA that can switch from the primary subchannel to operate, at least temporarily, on a different subchannel that does not include the primary 20 MHz subchannel is labeled as bandwidth aggregation (BWA) STA and/or a DSO STA. Such an STA indicates this capability when associating with an AP. BWA STAs include BWA information in association frames when associating with an AP. The information may include a BWA capability and/or switching latency information. The switching latency information may include information indicative of the time needed to switch between the Primary portion of a link (e.g., the 160 Primary, 160P) to the Secondary portion of the same or another link (e.g., the 160 Secondary, 160S).

In some embodiments, the movement of a STA from a primary is performed at the start or during a transmit opportunity (TXOP), known as a BWA TXOP. A BWA TXOP may refer to a time duration for which a STA device can send frames after the STA device has determined that it has access of the transmission medium, for example, through a contention process or through a scheduling process. In some embodiments, the time duration can include the trigger and other frames from the AP and the clients, where frames from the clients are sent in response to frames from the AP. At the end of the BWA TXOP, STAs that moved to the 160S move back to the 160P. In some embodiments, APs 106 are configured to perform the AP 106 functions of a BWA TXOP indicate this status in a management frame, such as Beacons and Association frames, and are labeled BWA APs.

In some embodiments, STAs that have an operational BW equal to the AP 106 may operate on any sub portion of the operating channel, when directed to do so. For example, a 320 MHz enabled STA operating in a 320 MHz BSS may be directed by the AP 106 to operate on only the 160 MHz secondary subchannel for the duration of a BWA TXOP. In these embodiments, an STA may operate using normally assigned resource unit (RU) allocations that lie in the 160S and participate in receiving multi-user orthogonal frequency-division multiple access (OFDMA) physical layer protocol data units (PPDUs) and in transmitting uplink multi-user OFDMA PPDUs as is already specified, for example, within the IEEE 802.11 (e.g., a, ... ax, ay, ba, be, etc.). In some embodiments, the STA operating on the 320 MHz channel nominally, with signals appearing in subchannel(s) of the 320 MHz. In some embodiments, the STA may additionally and/or alternatively operate as per the protocol. For example, an STA may be directed to operate on some subchannel in the same manner as described above. For an STA that is only capable of operating as 160 MHz, the 320 MHz STA is effectively operating as if it were a 160 MHz STA as described in the above protocol, in some embodiments. In some embodiments, the differences between the two modes for the 320 MHz STA include a change in the location of the 20P which the receiver may choose to use as a limited search location for the preamble of PPDUs during PPDU receiver detection. In some embodiments, the mode permits an AP transmitter to combine multiple PPDU formats by aggregating them in separate frequency subchannels and transmitting them at the same time, in parallel, such that detection of each such PPDU must be performed only on the subchannel on which it is being transmitted.

In some embodiments, a BWA AP is capable of creating a BWA TXOP that includes frame exchanges between the BWA AP and BWA STAs and/or a non-BWA STA operating on a non-primary subchannel of a specified BW and some other STAs operating on the primary subchannel of a specified bandwidth.

In some embodiments, an AP 106 operating bandwidth (e.g., a BSS BW) may be 320 MHz, and STA operating bandwidth(s) may be 160 MHz and/or 320 MHz. As briefly described above, other combinations are possible, as the dynamic subband operation may be applied to any suitable combination of operating bandwidths. In an example embodiment, a 320 MHz wide STA may also participate in the mechanism, as described herein above, in which case, the STA effectively becomes a 160 MHz operational STA during the associated BWA TXOP, at the direction of the AP in an initial frame that indicates that the STA should operate as such.

In some embodiments, A BWA AP may designate a 20 MHz subchannel of the 160S as the primary 20 MHz subchannel for the 160S subchannel. This designation allows any BWA STA operating on the 160S to have an identified 20P for that 160 MHz subchannel. For example, to enable a receiver to initially perform a new reception search on a single 20 MHz subchannel, in which case, the receiver needs to know on which 20 MHz to perform that search. The primary 20 MHz designation for a 20 MHz subchannel of the 160S may be communicated to the STAs within a management frame, such as Beacon, Association Response, Action frame, and/or other management frames. For alternative bandwidth values, the primary 20 MHz subchannel may be indicated for each subdivision. For example, a 320 MHz operating BW could be divided into 4×80 MHz pieces, in which case a primary 20 MHz subchannel would be indicated for each 80 MHz piece. The preamble of PPDUs transmitted on a BWA subchannel always exists on the 20P for that BWA subchannel, this accommodates minimal receiver 20 MHz subchannel searching implementations.

In some embodiments, HE SST allows an 80 MHz non-AP to operate on the 80S of a 160 MHz bandwidth or a 20 MHz non-AP to operate outside the 20P of a wider operating bandwidth. The operation can be permitted during pre-negotiated target wake time (TWT) service periods (SPs) of an individual TWT agreement and hence, follows a semi-static pattern. Downlink (DL) or trigger-based uplink (UL) can occur inside the SPs. In some embodiments, 802.11be can define an extension of 802.1 lax SST allowing a non-AP to operate on the 160S of a 320 MHz operating bandwidth.

In some embodiments, even if the AP wins channel access on the 160S channel during the SPs, there may not be any DL/UL buffered data for the SST non-APs during the SPs while data may arrive later outside of the SPs when all non-APs are present on the 160P. In some embodiments, the AP can serve the SST non-APs outside the SST SPs. The SST non-APs should not transmit anything to the AP outside these SST SPs. The AP can transmit to the SST non-APs outside the SST SPs only if they are in active mode and not if they are in PS mode. Individual TWT negotiation is initiated by the non-AP and hence cannot be enforced by the AP.

Protocol 1: Channel-Switch with Immediate Reponses (FIG. 2C)

Generally, Protocol 1 includes using a single transmission (sometimes referred to as two triggers in one transmission or a single trigger) by an AP that causes client devices to switch to a secondary bandwidth channel or remain on the primary bandwidth channel. Following the trigger, all client devices can transmit their respective designated RU allocations that lie in either the primary bandwidth channel or the secondary bandwidth channel. Thus, Protocol 1 may include multiple triggers within one transmission to different devices, and each trigger may include either (1) an indication of a first channel location for subsequent communication, where the first channel location is different from a second channel location on which a client device is currently operating when it receives the indication, or (2) instructions for a subsequent communication by the client device. In some embodiments, following responses during the transmit opportunity a first client device remains on the primary bandwidth channel and a second client device remains on the secondary bandwidth channel.

In some embodiments, the AP 106 is configured to execute a frame sequence to enable channel switching of non-APs in a network. A BWA AP sends a Buffer Status Report Poll (BSRP) (or another type of response) on at least the 160 Primary (160P) of a 320 MHz channel (shown as block 420 in FIG. 4). The BSRP can be included as instruction or data in a trigger provided to the non-APs in the network. A BSRP may refer to a message that includes a request for information indicative of an amount of data available for transmission (e.g., to/from the AP, to/from a client device, and/or to/from a STA). In some embodiments, the BSRP is a request for a BSR. In some embodiments, the BWA AP also sends the BSRP on the 160S of the 320 MHz channel (shown as blocks 430 and/or 440 in FIG. 4).

Existing rules require that a TXOP that includes any energy at any time during the TXOP within the 160S must begin with a frame that includes energy in the 160S. In some embodiments, these rules are configured to be modified (e.g., by the AP). RU allocations indicated in the BSRP for BWA STAs may be located in the 160S and/or the 160P. RU allocations indicated in the BSRP for non-BWA STAs are limited to the portion of the operating channel in which they are operating normally. In one example embodiment, a 160 MHz operating non-BWA STAs is only capable of operating in the 160P, so the RUs for such a STA must be in the 160P. In an additional example embodiment, in the case when there exists an 80 MHz operating non-BWA STA that is only capable of operating in the 80P, the RUs for such a STA must be in the 80P. It should be understood that other bandwidth limitations and/or requirements may exist with other STAs, and that the RUs for such STAs can be modified, customized, or otherwise changed based on the bandwidth limitations and/or requirements.

In some embodiments, if no RUs are located in the 160S (160S located RUs) for BWA STAs (recall from the introductory section that all STAs for the purposes of this explanation are assumed to be operating as 160 MHz or are 320 MHz STAs but obeying the 160S switch rules and effectively operating as 160 MHz STAs for the TXOP when instructed by the AP to do so), then the frame exchange is a normal exchange (e.g., non-BWA).

Figure 4:
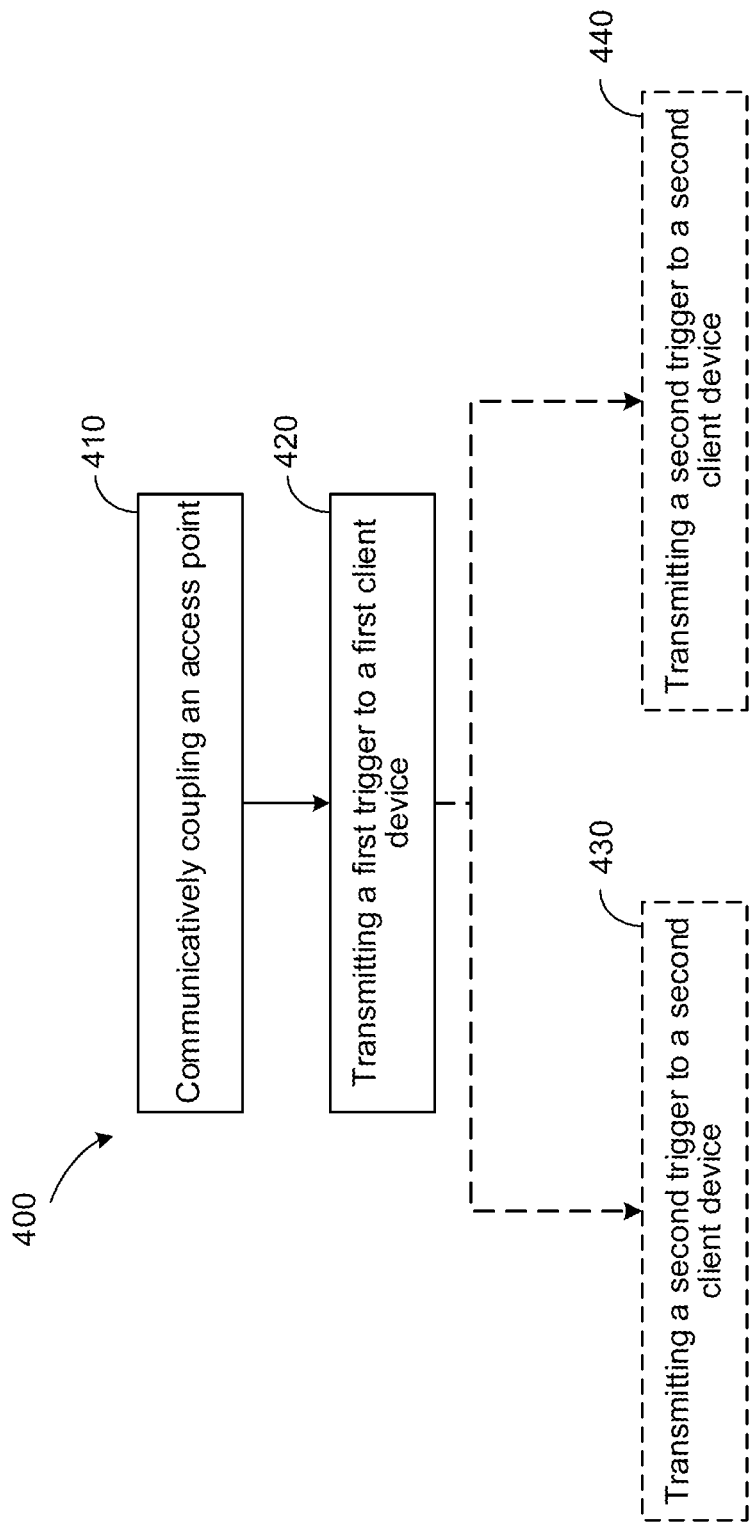
FIG. 4 is a flow diagram showing operation for channel switching, according to some embodiments.

In some embodiments, the BSRP may be constructed such that the indication of 160S RU allocations for 160 MHz STAs in this BSRP frame implies that those STAs need to move to the 160S (shown as blocks 430 and/or 440 FIG. 4). In some embodiments, 320 MHz STAs are excluded from moving to the 160S and remain operating on the full 320 MHz (shown as block 420 FIG. 4).

In some embodiments, the indication of when a STA should move from the 160P to the 160S is an explicit indication. For example, a single bit may be allocated to each STA information and the single bit is set for each STA addressed in the BSRP to indicate whether the STA should remain operating on the 160P or move to the 160S. The bit could also be used by a 320 MHz STA to indicate a command to move to 160S for a particular TXOP. An explicit indication may be present within a common area of the BSRP frame, provided to all STA addressed by the frame are BWA STAs that are flagged to move to the 160S and/or to the STAs addressed by the frame that are a mix of BWA STAs and non-BWA STAs. In some embodiments, the non-BWA STAs regard the bit used to indicate a move to the 160S as reserved or having no meaning. That is, only BWA STAs will act on the bit when it has the value indicating "move to 160S". In some embodiments, 320 MHz STAs may not use and/or ignore such a bit and would always remain operating on the full 320 MHz. An additional explicit indication may be present in the common area of the BSRP that is used to indicate only to 320 MHz STAs that 320 MHz STAs are commanded to operate on the 160S for this TXOP if they are assigned a 160S RU allocation in this BSRP.

In some embodiments, the BSRP includes sufficient padding to cover the channel switch latency that was indicated by involved BWA STAs during association if any RUs located in the 160S were allocated to any 160 BWA STA. In some embodiments, secondary 160S located RUs might be allocated in a BSRP only to 320 MHz capable STAs. In these embodiments, switching latency may not be required. In some embodiments, the BSRP may also be an indication of eMLSR operational switching between links.

In some embodiments, BWA STAs that received a 160S located RU move a radio to 160S during the time that the padding appears on the air. Decoding of the remaining BSRP occurs concurrently and/or partially concurrently, to validate the frame check sequence (FCS) of the BSRP as a STA can only respond to the BSRP if it has been validated.

In some embodiments, a short interframe space (SIFS) after the BSRP ends, both BWA and non-BWA STAs respond with the required trigger-based (TB) PPDU response to the BSRP. Thus, each trigger can be sent in a single transmission from AP 106 to non-APs and in response each non-AP may switch their bandwidth channel and/or provide a response.

BWA STAs respond with TB PPDUs per a respective RU allocations that was indicated in the BSRP, either 160S or 160P. 160 MHz non-BWA STAs respond with TB PPDUs on 160P only, per a respective RU allocations that was indicated in the BSRP. 320 MHz non-BWA STAs respond with TB PPDUs wherever indicated in the BSRP, either in the 160P or the 160S. In some embodiments, the TB PPDU may include a buffer status report (BSR) or another type of response. The BSR is any form of data and includes information indicative of an amount of data available for transmission (e.g., e.g., to/from the AP, to/from a client device, and/or to/from a STA) in some embodiments. The BSR is sent in response to a BSRP in some embodiments.

In some embodiments, following a correct BSRP response (BSR in a TB PPDU), the AP may initiate any combination of frame exchanges with the set of STAs on both 160P and 160S. In an example embodiments, DL MU OFDMA PPDUs addressing STAs on 160P and 160S and their associated BA response frames. In an additional example embodiment, a first trigger (e.g., a trigger frame) that address STAs on 160P and 160S, are triggered TB PPDUs and any necessary BA responses. It should be understood that additional sequences of the above exchanges may continue in a single TXOP, and the additional sequences may include null data packet announcement/null data packet (NDPA/NDP), high efficiency and extremely high throughput (HE+EHT) aggregated PPDU format PPDU.

In some embodiments, BWA STAs may move radios to another position (e.g., move the radio tuned to a 160S to a 160P) at the end of the BWA frame exchange TXOP. In an example embodiment, similar to the enhanced multi-link single-radio (eMLSR) TXOP end, no clear to send (CTS) or MAC-frame addressed to the STA is received within SIFS+ delay from the last received PPDU that was addressed to the STA indicates the end of the BWA TXOP.

Protocol 2: Channel-Switch without Immediate Response (FIG. 2C)

Generally, Protocol 2 includes using two separate transmission (sometimes referred to as a first trigger in a first transmission and a second trigger in a second transmission) by an AP. The first transmission using a first trigger can cause some client devices to switch from a primary bandwidth channel to a secondary bandwidth channel while providing no information to other client devices and which generates no response from any of the client devices. Following the first trigger, a second transmission using a second trigger can instruct all client devices to transmit their respective designated RU allocations that lie in either the primary bandwidth channel or the secondary bandwidth channel. FIG. 2C includes similar features and functionalities as described in detail with reference to FIG. 2B.

Access Point with Dynamic Subband Operations

Figure 2A:
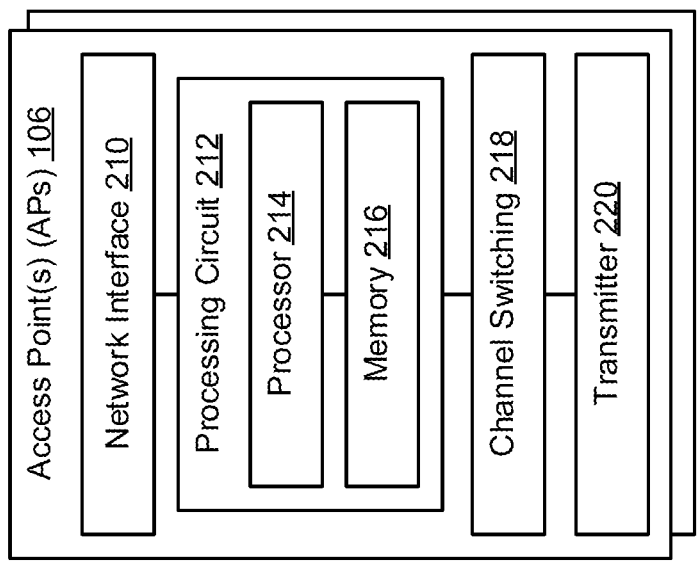
FIG. 2A is a general block diagram of a device configured for dynamic subband operations according to some embodiments.

Referring to FIG. 2A, a general block diagram of an access point 106 configured for dynamic subband operations according to some embodiments. In some embodiments, the access point 106 includes a network interface 210, processing circuit 212, processor 214, memory 216, channel switching module 218, and transmitter 220. The processing circuit 212 includes a processor 214, memory 216, channel switching module 218, and transmitter 220. The processing circuit 212 is any circuits or components that can perform logic and communication processing. In some embodiments, the processing circuit 212 is implemented as a field-programmable gate array, an application-specific integrated circuit, hardware, a software executing processor, or state machines. In some embodiments, the processing circuit 212 is parts of layers (e.g., MAC, network, PHY layers) of IEEE 802.11 standard devices. The processing circuit 212 can be configured to perform communication operations, frame building and processing, association operations, authorization operations, and connection setup in some embodiments. Instructions for the processing circuit 212 are stored in a non-transitory medium such as memory 216 in some embodiments.

The memory 116 may be one or more devices (e.g., RAM, ROM, Flash memory, hard disk storage) for storing data and/or computer code for completing and/or facilitating the various processes described herein. The memory 216 may be or include non-transient volatile memory, non-volatile memory, and non-transitory computer storage media. Memory 216 may include database components, object code components, script components, or any other type of information structure for supporting the various activities and information structures described herein. Memory 216 may be communicably coupled to the processor 214 and include computer code or instructions for executing one or more processes described herein. The processor 214 may be implemented as one or more application specific integrated circuits (ASICs), field programmable gate arrays (FPGAs), a group of processing components, or other suitable electronic processing components. As such, the access point(s) 106 is configured to run a variety of modules and/or programs and store associated data in a database of the memory 216. The modules (e.g., 218 and 220) can be implemented in AP software (e.g., MAC layer software) or STA software (e.g., MAC layer software).

In some embodiments, the network interface 210 is structured and used to establish connections with other computing systems and devices (e.g., wireless communication device(s) 102, network hardware 192, other access points 106, etc.) via a network (e.g., WAN connection, LAN connection, WLAN connection, etc.). The network interface 210 includes program logic that facilitates connection of the access point 106 to the network connections. For example, the network interface 210 may include any combination of a wireless network transceiver (e.g., a cellular modem, a Bluetooth transceiver, a Wi-Fi transceiver, etc.) and/or a wired network transceiver (e.g., an Ethernet transceiver). In some arrangements, the network interface 210 includes the hardware (e.g., processor, memory, and so on) and machine-readable media sufficient to support communication over multiple channels of data communication. A network interface or network interface circuit may refer to any circuit or circuitry (with or without software) configured to establish connections with other computing systems. The network interface circuit can include a physical layer circuitry necessary for communicating with a data link layer standard, such as Ethernet or Wi-Fi. The circuit can prepare and control the flow of data on the network In some embodiments, processing circuit 212 includes a channel switching module 218 (sometimes referred to as a "channel switching circuit 218"). The channel switching module 218 can be configured to communicatively couple with one or more client devices (e.g., non-AP devices 102, referred to hereafter as "devices 102") and can be configured to allocate the one or more devices 102 on one of a primary bandwidth channel or a secondary bandwidth channel. In particular, the channel switching module 218 can be configured to perform the dynamic subband operations described herein. For example, the channel switching module 218 can be configured to determine a network traffic of the devices 102. Accordingly, the channel switching module 218 may utilize a channel switching protocol to improve network traffic (e.g., uplink traffic and downlink traffic) from the AP 106 to the device(s) 102. That is, device(s) 102 may be split between different parts of the 320 MHz spectrum, on different channels. The channel switch protocol includes moving between primary and secondary channels. In particular, channel switching module 218 enable an AP 106 to dynamically switch devices 102 between channels based on, for example actual network traffic and/or expected network traffic. For example, the channel switching module 218 can be configured to switch the device 102 (or AP 106 or a different AP 106) from a primary bandwidth channel to operate on a secondary bandwidth channel. In particular, the channel switching module can determine if a device 102 should switch channels based on (i) a bandwidth availability, (ii) a quality of service requirement, and/or (iii) a secondary bandwidth switching capability. A channel switching circuit or unit may refer to any circuit or circuitry (with or without software) configured to designate one or more devices to communicate on a channel or portion of a channel.

In various embodiments, processing circuit 212 includes a transmitter module 220 (sometimes referred to as a "transmitter circuit 220"). The transmitter module 220 can be configured to provide or transmit triggers to device(s) 102 such that the trigger can cause the device(s) 102 to remain on a bandwidth channel (e.g., primary) or switch to a different bandwidth channel (e.g., secondary). For example, transmitter module 220 can transmit a first trigger to a first device 102, where the first trigger causes the first device 102 to remain on a primary bandwidth channel based on at least one of (i) a bandwidth availability, (ii) a quality of service requirement, or (iii) a secondary bandwidth switching capability. In another example, transmitter module 220 can transmit a second trigger to a second device 102, where the second trigger causes the second device 102 to switch to the secondary bandwidth channel based on at least one of (i) a bandwidth availability, (ii) a quality of service requirement, or (iii) a secondary bandwidth switching capability. In some implementations, the channel switching executed by the channel switching module 218 and transmitted by the transmitter module 220 can occur during a transmit opportunity such that a transmit opportunity indicates when (such as a period of time or time duration) to transmit a first trigger or a second trigger to the device 102. In some embodiments, a transmit opportunity may refer to a time duration for sending a trigger. In some embodiments, the time duration can include the trigger and other frames from the AP and the clients, where frames from the clients are sent in response to frames from the AP.

In some embodiments, the start of a transmit opportunity is a transmission of a trigger. The time duration can be a period of contention free channel access available to the AP for sending triggers in some embodiments. In some implementations, the first trigger can be a first frame sequence (as shown with reference to FIG. 2B-C and FIG. 3) and the second trigger can be a second frame sequence. For example, the first frame sequence can include sending (e.g., by the transmitter module 220) a first message (e.g., buffer status response poll) to a first device 102, and the second frame sequence can include sending a second message (e.g., buffer status response poll) to a second device 102. In some implementations, the channel switching gains can be proportional to the ratio of the AP bandwidth capability to the non-AP bandwidth capability. A "bandwidth capability" may refer to a capacity at which a device (e.g., the AP and/or the non-AP) can transmit data, which may be measured in hertz (e.g., MHz, GHz, etc.) or bits per second (e.g., kilobits per second, megabits per second, etc.). A "ratio" of bandwidth capability refers to a mathematical relationship between the bandwidth capability of at least two devices (e.g., an AP and a non-AP). In some embodiments, different types of data may be transmitted via different protocols by the transmitter module 220. Transmission can occur via the network interface 210 to network connections (e.g., devices 102, network hardware 192) using various networking protocols. In some embodiments, the transmitter module 218 can also be configured to perform channel-sounding. Channel sounding can include the transmission (e.g., by transmitter module 220) of a null-data-packet announcement (NDPA) frame followed by a null-data-packet (NDP), or an initial control frame or an initial control frame exchange. A transmitter is any circuit for communicating radio frequency data, such as frames.

In some embodiments, the first trigger and second trigger can include overlapping content and/or non-overlapping content. For example, in a frame with multiple distinct fields, a first trigger may refer to a first set of fields and a second trigger may refer to a second set of fields such that the first set and second set have at least some sub-fields in common. In some embodiments, the 802.11 standard (or another networking standard) may define a trigger frame format that consists of a single "Common Info" field and multiple "User Info" fields. In particular, the "Common Info" field may be intended for all clients, while the "User Info" fields may be intended for specific clients. In some embodiments, all clients may decode all the "User Info" fields, but the information contained in each may be intended for the client identified specifically via a sub-field (e.g., STA_ID) in the "User Info" field. For example, the first trigger can include a "Common Info" field and one "User Info" fields, while the second trigger may include the same "Common Info" field but a different "User Info" field (e.g., different from the first trigger). In another example, the first trigger can include a "Common Info" field and one "User Info" fields, while the second trigger may include only the "Common Info" field (e.g., for clients that are not addressed by any of the User). In particular in the above example, the "Common Info" field together with the absence of a "User Info" field addressed to a particular client can be interpreted as a second trigger for that client. In yet another example, the first trigger can include a first "Common Info" field and one "User Info" field, while the second trigger may include a second "Common Info" field and a second "User Info" field. In particular in the above example, the "Common Info" fields and the "User Info" fields (and any other fields) may not overlap between triggers. It should be understood that the above first trigger and second trigger content can be implemented in Protocol 1 and Protocol 2 described herein.

Figure 2B:
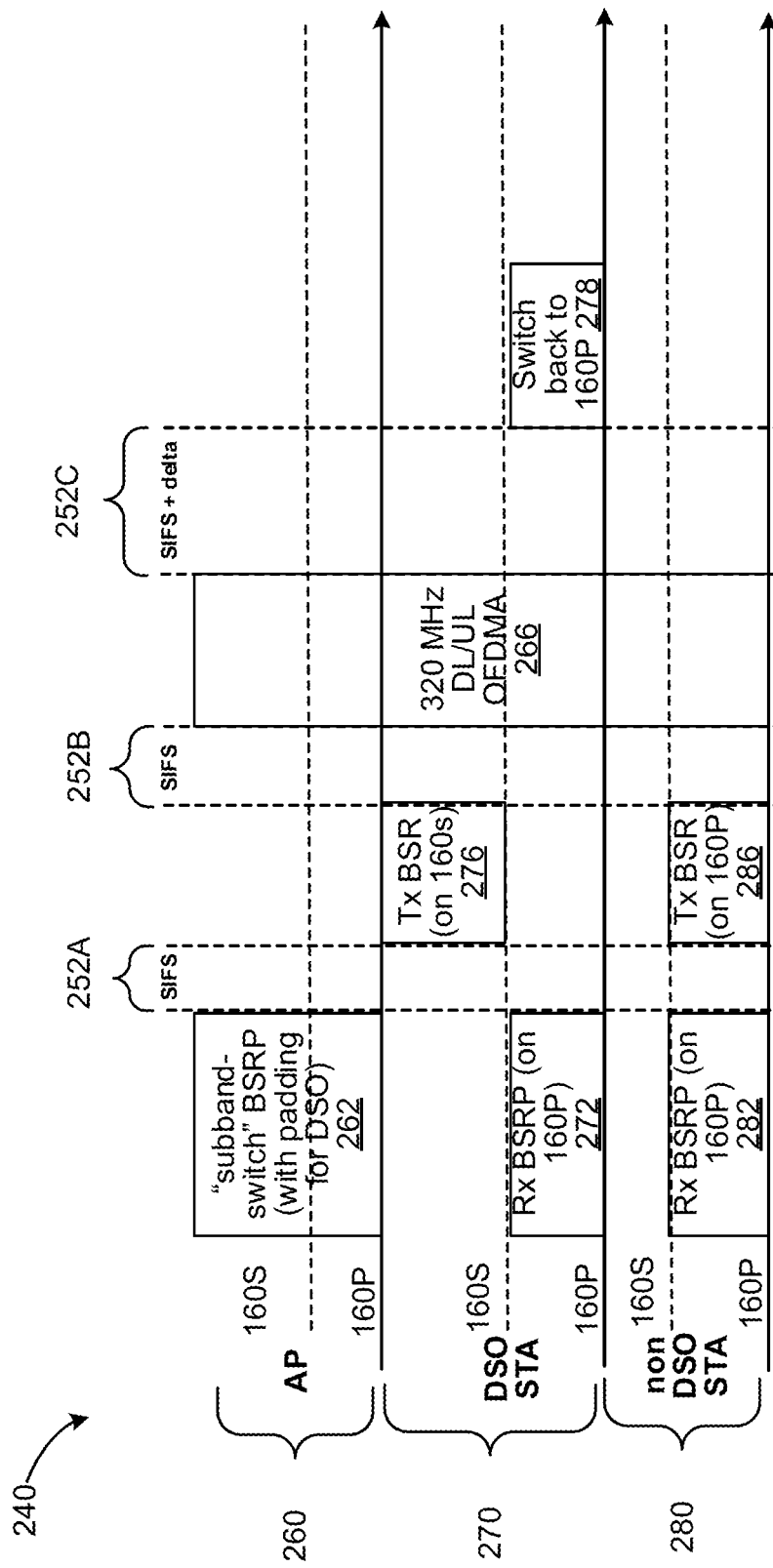
FIG. 2B is a schematic timing diagram depicting dynamic subband operations for devices such as the devices illustrated in FIGS. 1A-C, according to some embodiments.
Figure 2C:
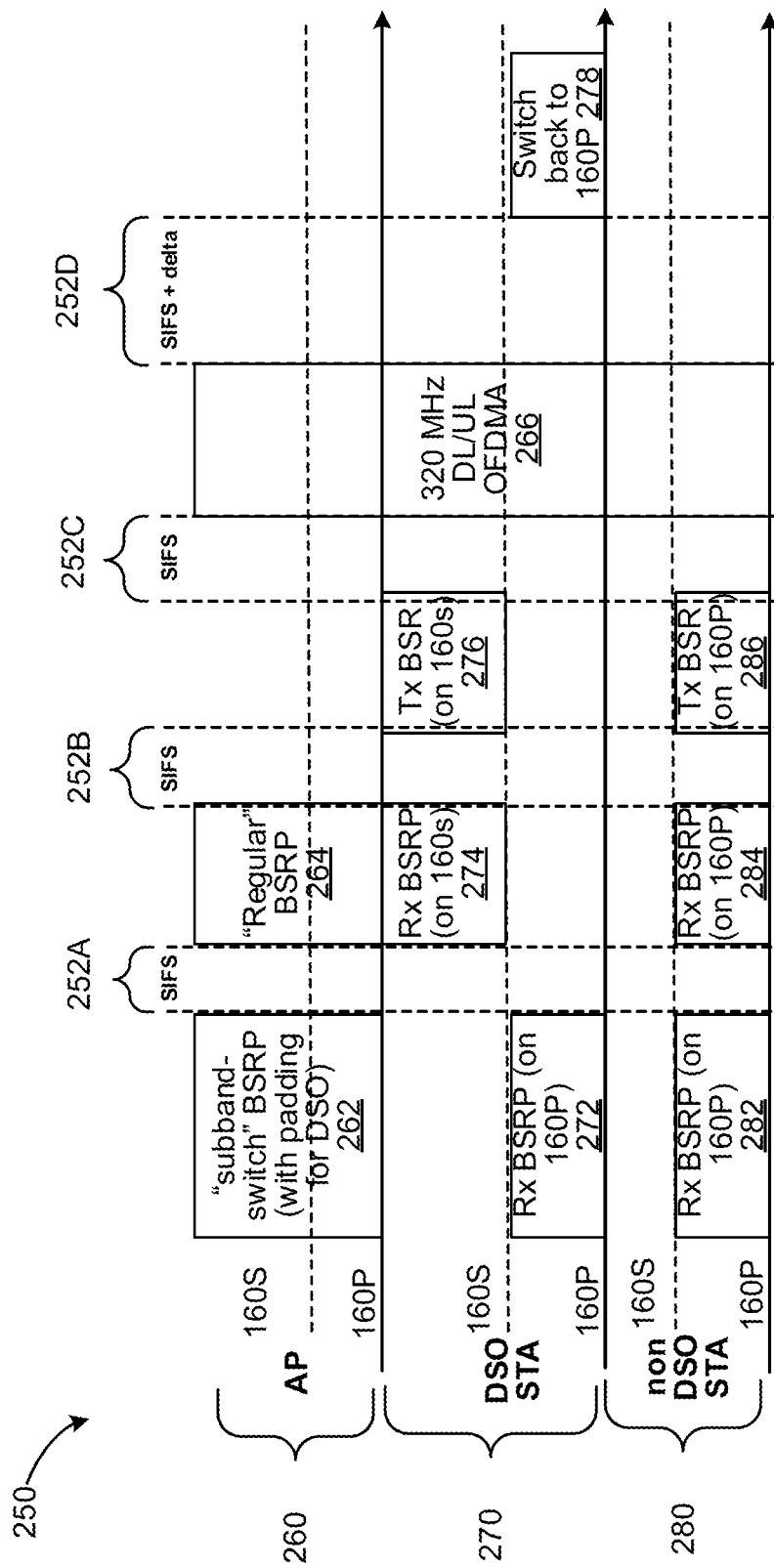
FIG. 2C is a schematic timing diagram depicting dynamic subband operations for devices such as the devices illustrated in FIGS. 1A-C, according to some embodiments.

Referring to FIG. 2B, a schematic diagram for DSO 240 is depicted. In some embodiments, a BWA AP 260 sends BSRP 262 on at least the 160 Primary (160P) of one link (e.g., 5 or 6) (shown as block 420 in FIG. 4). Alternatively, the BWA AP 260 sends BSRP 262 on at least the 160S of one link (shown as block 420 in FIG. 4). In some embodiments, the BWA AP 260 sends the BSRP 262 on the 160S and the transmission occupies the entire 320 MHz AP (shown as blocks 430 and/or 440 in FIG. 4). This BSRP 262 addresses the scheduled DSO non-APs 270 as well as any non-DSO non-APs 280. That is, even though each of the scheduled DSO non-APs 270 that need to transition to the 160S (or to 160P, from 160S) and indicates RU allocations for them in the 160S, also the non-DSO non-APs 280 will receive a transmission. Existing rules require that a TXOP that includes any energy in the 160S must begin with a frame that includes energy in the 160S. In some embodiments, these rules are configured to be modified (e.g., by the AP).

In some embodiments, the recipient STAs do not transmit a response. For example, the BSRP 262 may not be a channel switching BSRP. In some embodiments, the recipient STAs do transmit a response. For example, the BSRP 262 may not be a channel switching BSRP but have a response. The subband switch BSRP 262 is used only for subband switching by DSO non-Aps (e.g., by channel switching module 218). The subband switch BSRP 262 does not necessarily elicit a response because a non-AP can transmit a response only if the BSRP 262 passes a FCS check and a non-AP decodes the BSRP FCS on the 160P before it switches (e.g., by channel switching module 218) to the 160S.

The BSRP 262 includes sufficient padding to cover channel switch latency indicated during the association. The subband switching latency depends on the non-AP implementation and is negotiated during the DSO capability signaling. In some embodiments, the BWA STAs with 160S located RU allocations move a radio to 160S during the padding reception. When 160S is located, the RUs are allocated in a BSRP only to 320 MHz capable STAs, there is no switching latency required in some embodiments.

Concurrent decoding of the remainder of the BSRP 262 to check the FCS to validate the BSRP reception is not necessary in this case because there is no immediate response to the BSRP. RU allocations indicated in the BSRP 262 are all only 160S located RUs and all indicated only for BWA STAs that are directed to move to the 160S. Non-BWA STAs may not see an RU allocation in this BSRP. BWA STAs not being directed to the 160S may not see an RU allocation in this BSRP. The directive to move to 160S can either be implicit or explicit as described in Protocol 1, above.

In some embodiments, the BSRP 262, may optionally include a 1-bit indication that this BSRP requires no response. To make response determination simpler the 1-bit indication can also serve as an explicit indication that the purpose of the BSRP 262 is to cause BWA STAs being addressed by the BSRP to move to 160S. Additionally and/or alternatively to using a BSRP, a new frame, (e.g., a subchannel switch frame) may be defined with the explicit purpose of indicating which STAs should move to which subbands. Such a Subchannel Switch frame may be permitted to be aggregated in an AMPDU, where the subsequent MPDU acts as padding to allow validation of the FCS to occur before the switch to a different subchannel occurs. The subsequent MPDU may be a dummy, padding MPDU. In some embodiments, SIFS after the BSRP ends, the AP may transmit (e.g., by transmitter module 220) any normal frame exchange sequence (a TXOP) with the assumption that STAs that were directed to move to 160S are operating on 160S for the duration of the TXOP.

In some embodiments, the BSRP 262 can also serve as a response confirming that the scheduled non-APs have switched to the allocated resources (and the unscheduled non-APs have not switched). In some embodiments, the BSRP 262 can include a plurality of triggers in the same transmission but to different non-APs. In some embodiments, at least one of the non-APs remain on the primary bandwidth channel and responds to a second trigger, and where at least one of the one or more non-APs switch to the secondary bandwidth channel and responds to a first trigger. For example, one of the non-APs can transmit a first response (e.g., buffer status report poll) in response to receiving a first message (e.g., buffer status response poll) in a first trigger, and where another one of the non-APs transmits a second response (e.g., buffer status report poll, on at least the primary bandwidth channel) in response to receiving a second message (e.g., buffer status response poll) in the second trigger, where both the first trigger and second trigger are included in the BSRP 262.

For DSO non-APs 270 being scheduled on the 160S, the BSRP 262 can indicate the same RU allocation as the subband-switch BSRP. For non-DSO non-APs 280 being scheduled on the 160S, the BSRP 262 can indicate the same RU allocation as the subband-switch BSRP. In some embodiments, a SIFSTime 252A after BSRP 262, both DSO non-APs 270 and non-DSO non-APs 280 (generally referred to as STAs) respond with BSR PPDUs, a DSO STA BSR on 160S 276 or a non-DSO STA BSR on 160P 286, according to their allocated RUs. After switching to the 160S, the DSO non-AP does not detect a CTS-to-self or other MAC-frame addressed to itself within a specified period of time (e.g., aSIFSTime+aSlotTime+aRxPHYStartDelay) starting from the end of the (a) previous response PPDU transmitted by it or (b) the previous PPDU received by it in case it did not elicit any response, the DSO non-AP switches back to the 160P. In some embodiments, the DSO TXOP contains multiple SIFS-spaced 252C DL/triggered UL exchanges 266 with the DSO non-APs a SIFSTime 252B after the DSO and non-DSO STAs respond with BSR PPDUs according to their allocated RUs. In some embodiments, the end of a DSO TXOP (e.g., after a SIFSTime 252C, SIFS+delta) is marked by the DSO non-AP switching back to operating on 160P 278 after the SIFS-spaced DL/triggered UL exchanges have completed as indicated by lack of detection of a PPDU within a specified period of time (e.g., aSIFSTime+aSlotTime+aRxPHYStartDelay) starting from the end of the (a) previous response PPDU transmitted by it or (b) the previous PPDU received by it in case it did not elicit any response).

Accordingly, the BSRP 262 can contain a first trigger and a second trigger in a single transmission to the non-APs. In particular, first trigger (BSRP 262) an indication of a first channel location for subsequent communication, and wherein the first channel location is different from a second channel location on which at least the non-APs of the one or more non-APs is currently operating when it receives the indication. In some embodiments, the first channel location can be a first RU allocation in the secondary bandwidth channel and the second channel location can be second RU allocation in the primary bandwidth channel, where the first trigger and the second trigger enable the subsequent communication (e.g., response confirming that the scheduled non-APs have switched to the allocated resources).

In some embodiments, a DSO non-APs 270 receives Rx BSRP 272 on at least the 160P of one link. For example, the beginning of a DSO TXOP, a DSO non-AP 270 receives Rx BSRP 272 while operating on 160P before the SIFS-spaced exchanges. In various embodiments, a non-DSO non-APs 280 receives Rx BSRP 282 on at least the 160P of one link. For example, at the beginning of a DSO TXOP, a non-DSO non-AP 280 receives Rx BSRP 282 while operating on 160P before the SIFS-spaced exchanges.

In some embodiments, a determination of the end of the BWA TXOP is the same as protocol 1, described herein above. In some embodiments, DSOs can be defined such that narrower bandwidth capable non-APs can dynamically, on a per-TXOP basis, allocate resources outside of their current operating bandwidth within the larger bandwidth of an AP. In some embodiments, an implementation of DSO may include using a BSRP trigger (e.g., a trigger frame) that can dynamically indicate to the non-AP, the presence of an allocation for it outside its current operating bandwidth (via the RU allocation sub-field of the corresponding User Info field).

Referring to FIG. 2C, a schematic diagram for DSO 250 is depicted. DSO 250 includes similar features and functionalities as described with reference to DSO 240 of FIG. 2B. In general, instead of executing Protocol 1, FIG. 2C discloses Protocol 2, where two separate transmissions occur—262 and 264. In some embodiments, a BWA AP 260 sends BSRP 262 on at least the 160 Primary (160P) of one link (e.g., 5 or 6) (shown as block 420 in FIG. 4). In some embodiments, the BWA AP 260 sends the BSRP 262 on the 160S and the transmission occupies the entire 320 MHz AP (shown as blocks 430 and/or 440 in FIG. 4). This BSRP 262 is addressed to all the scheduled DSO non-APs that need to transition to the 160S and indicates RU allocations for them in the 160S. Existing rules require that a TXOP that includes any energy in the 160S must begin with a frame that includes energy in the 160S. In some embodiments, these rules are configured to be modified (e.g., by the AP).

In some embodiments, the recipient STAs do not transmit a response. For example, the BSRP 262 may not be a channel switching BSRP. The subband switch BSRP 262 is used only for subband switching by DSO non-Aps (e.g., by channel switching module 218). The subband switch BSRP 262 does not necessarily elicit a response because a non-AP can transmit a response only if the BSRP 262 passes a FCS check and a non-AP decodes the BSRP FCS on the 160P before it switches (e.g., by channel switching module 218) to the 160S.

The BSRP 262 includes sufficient padding to cover channel switch latency indicated during the association. The subband switching latency depends on the non-AP implementation and is negotiated during the DSO capability signaling. In some embodiments, the BWA STAs with 160S located RU allocations move a radio to 160S during the padding reception. When 160S is located, the RUs are allocated in a BSRP only to 320 MHz capable STAs, there is no switching latency required in some embodiments.

Concurrent decoding of the remainder of the BSRP 262 to check the FCS to validate the BSRP reception is not necessary in this case because there is no immediate response to the BSRP. RU allocations indicated in the BSRP 262 are all only 160S located RUs and all indicated only for BWA STAs that are directed to move to the 160S. Non-BWA STAs may not see an RU allocation in this BSRP. BWA STAs not being directed to the 160S may not see an RU allocation in this BSRP. The directive to move to 160S can either be implicit or explicit as described in protocol 1, above.

In some embodiments, the BSRP 262, may optionally include a 1-bit indication that this BSRP requires no response. To make response determination simpler the 1-bit indication can also serve as an explicit indication that the purpose of the BSRP 262 is to cause BWA STAs being addressed by the BSRP to move to 160S. Additionally and/or alternatively to using a BSRP, a new frame, (e.g., a subchannel switch frame) may be defined with the explicit purpose of indicating which STAs should move to which subbands. Such a Subchannel Switch frame may be permitted to be aggregated in an AMPDU, where the subsequent MPDU acts as padding to allow validation of the FCS to occur before the switch to a different subchannel occurs. The subsequent MPDU may be a dummy, padding MPDU. In some embodiments, SIFS after the BSRP ends, the AP may transmit (e.g., by transmitter module 220) any normal frame exchange sequence (a TXOP) with the assumption that STAs that were directed to move to 160S are operating on 160S for the duration of the TXOP.

In some embodiments, the AP sends a second regular BSRP 264 a SIFSTime 252A later after the AP 106 sends the first BSRP. That is, unlike in FIG. 2B where one BSRP 262 is transmitted, a second regular BSRP 264 can be transmitted to all non-APs. For example, a first trigger (262) and the second trigger (264) can be separate transmissions by the AP 260. In some embodiments, first trigger (262) includes an indication of a first channel location for subsequent communication, and where the first channel location is different from a second channel location on which at least a non-AP of the non-APs is currently operating when it receives the indication. For example, the first channel location is a first RU allocation in the secondary bandwidth channel and the second channel location is a second RU allocation in the primary bandwidth channel, and wherein the second trigger (264) enables the subsequent communication. In some embodiments, the AP 260 can transmit the second trigger (BSRP 264) on the secondary bandwidth channel to multiple non-APs such that the second trigger includes instructions for the subsequent communication by the non-APs. For example, a first non-AP switches from the 160P (or 160S) to 160S (or 160P) after the first trigger (262) such that the first trigger is a start of a transmit opportunity, and where the second trigger (264) requests responses including the subsequent communication from the first non-AP on the 160S and a second non-AP on the 160P. For example, during the transmit opportunity the first client device can remain on the secondary bandwidth channel and the second client device can remain on the primary bandwidth channel This BSRP addresses the scheduled DSO non-APs 270 as well as any non-DSO non-APs 280. The second BSRP 264 serves as a response confirming that the scheduled non-APs have switched to the allocated resources. For DSO non-APs 270 being scheduled on the 160S, the secondary BSRP 274 can indicate the same RU allocation as the subband-switch BSRP. For non-DSO non-APs 280 being scheduled on the 160S, the secondary BSRP 284 can indicate the same RU allocation as the subband-switch BSRP. In some embodiments, a SIFSTime 252B after the second BSRP, both DSO non-APs 270 and non-DSO non-APs 280 (e.g., STAs) respond with BSR PPDUs, a DSO STA BSR on 160S 276 or a non-DSO STA BSR on 160P 286, according to their allocated RUs. After switching to the 160S, the DSO non-AP does not detect a CTS-to-self or other MAC-frame addressed to itself within a specified period of time (e.g., aSIFSTime+aSlotTime+aRxPHYStartDelay) starting from the end of the (a) previous response PPDU transmitted by it or (b) the previous PPDU received by it in case it did not elicit any response, the DSO non-AP switches back to the 160P. In some embodiments, the DSO TXOP contains multiple SIFS-spaced 252D DL/triggered UL exchanges 266 with the DSO non-APs a SIFSTime 252C after the DSO and non-DSO STAs respond with BSR PPDUs according to their allocated RUs. In some embodiments the end of a DSO TXOP is marked by the DSO non-AP switching back to operating on 160P 278 after the SIFS-spaced DL/triggered UL exchanges have completed as indicated by lack of detection of a PPDU within a specified period of time (e.g., aSIFSTime+aSlotTime+aRxPHYStartDelay) starting from the end of the (a) previous response PPDU transmitted by it or (b) the previous PPDU received by it in case it did not elicit any response).

In some embodiments, a DSO non-APs 270 receives Rx BSRP 272 on at least the 160P of one link. For example, the beginning of a DSO TXOP, a DSO non-AP 270 receives Rx BSRP 272 while operating on 160P before the SIFS-spaced exchanges. In various embodiments, a non-DSO non-APs 280 receives Rx BSRP 282 on at least the 160P of one link. For example, at the beginning of a DSO TXOP, a non-DSO non-AP 280 receives Rx BSRP 282 while operating on 160P before the SIFS-spaced exchanges.

In some embodiments, a determination of the end of the BWA TXOP is the same as protocol 1, described herein above. In some embodiments, DSOs can be defined such that narrower bandwidth capable non-APs can dynamically, on a per-TXOP basis, allocate resources outside of their current operating bandwidth within the larger bandwidth of an AP. In some embodiments, an implementation of DSO may include using a BSRP trigger (e.g., a trigger frame) that can dynamically indicate to the non-AP, the presence of an allocation for it outside its current operating bandwidth (via the RU allocation sub-field of the corresponding User Info field).

Channel-Sounding

Referring now to FIG. 3, an example illustration of a bit field 300, according to some embodiments. The bit field 300 (e.g., STA Info bit field) in an extremely high throughput (EHT) null data packet announcement (NDPA) frame 100 is shown. As shown, bits 0 through 10 include the application identifier (AID11) field 310 which consists of three subfields (312, 316, and 318): 0, 1-2007, and 2008-2042. Field 310 provides a breakdown of the subfields within the AID11 field. At AID subfield 312, the STA Info field is addressed to the associated AP or mesh AP or independent basic service set (IBSS) STA. The NDPA frame is applicable to any variant for subfield 0. At AID subfield 314, the STA Info field is addressed to an associated STA whose AID is equal to the value in the AID11 subfield if the NDP Announcement frame is not a ranging variant. The STA Info field is addressed to an associate STA whose RSID/AID is equal to the value in the RSID11/AID11 subfield if the NDP Announcement frame is a ranging variant. The value 2007 is reserved for EHT variant. The NDPA frame is applicable to any variant for subfield 1-2007. AID subfield 316 are reserved and the NDPA frame is not applicable to any variant. Furthermore, bits 11 through 19 include the Partial BW Info field 320, bit 20 is a Reserved field 330. Moreover, bits 21 through 24 are the Nc Index field 340, bits 25 through 26 are the Feedback Type and Ng field 350. Also as shown, bit 27 is the Disambiguation field 360, bit 28 is the Cookbook Size field 370, and bits 29 through 31 are a Reserved field 380.

Channel-sounding can include the transmission of a null-data-packet announcement (NDPA) frame followed by a null-data-packet (NDP). Additionally, channel-sounding also can include an initial control frame or an initial control frame exchange. In some embodiments, the NDPA frame may be modified to serve as the initial control frame itself instead of using an initial control frame exchange (e.g., MU-RTS/CTS, or BSRP/BSR) prior to the NDPA. In some embodiments, the NDPA may include padding to cover channel-switch latency. For example, the padding may include dummy bit fields 300, using a reserved AID value in field 310. In various embodiments, the NDPA frame for BWA STAs may indicate that the recipient STA could switch to a secondary channel. For example, the NDPA may request sounding-feedback on a secondary channel (e.g., 80S/160S) in the Partial BW Info field 320 of the corresponding STA Info field 300.

In some embodiments, in lieu of padding the BSRP or another frame that initiates a channel-switch (e.g., by channel switching module 218), an AP may use a "filler PPDU" SIFS after the BSRP, that consists of a QoS-null MPDU and padding MPDU delimiters. The filler PPDU allows for checking FCS before switching channels. Similar to having two BSRP transmissions, the filler PPDU is "dummy" information that includes padding information. Additionally, and/or alternatively, the filler PPDU may contain information for other STAs.

In some embodiments, the filler PPDU may use an AMPDU format, where an earlier MPDU in the AMPDU is the channel switch MPDU. A later MPDU is a "filler MPDU" that allows for complete reception and FCS validation of the channel switch MPDU. The filler MPDU is "dummy" information, including padding information. Additionally, and/or alternatively, the filler MPDU may contain useful information for other STAs In a second additional and/or alternative embodiment, an initial frame in protocol 2 could be some other frame defined for the purpose of asking some STAs to move to 160S. For example, the initial frame could be any frame other than BSRP that has at least part of its purpose to indicate to some BWA STAs that they need to be on 160S for the remainder of the TXOP.

In a third additional and/or alternative embodiment, in addition to or alternative to using a BSRP, a new frame, such as a subchannel switch frame, may be defined with the explicit purpose of indicating which STAs should move to which subbands.

In a fourth additional and/or alternative embodiment, in addition to or alternative to using 160S RU allocations (e.g., in protocol 2) in the BSRP to signal a subchannel switching command (e.g., by channel switching module 218), the RU allocation field values could be reinterpreted to provide explicit subchannel switching command information. An additional bit may be used in the common area of the BSRP or in the per user area to indicate the reinterpretation of the field.

In a fifth additional and/or alternative embodiment, a specific sounding frame exchange sequence that begins with subchannel switching may use an NDPA containing subchannel switching information in the partial BW Info field to initiate the subchannel switching as described in a separate document. In these embodiments, padding of the NDPA to accommodate the switching time may be created by using dummy STA info fields.

In a sixth additional and/or alternative embodiment, the end of the BWA TXOP may be explicitly signaled by the AP (e.g., via another frame at the end of the TXOP).

Referring now to FIG. 4, a flowchart for a method 400 of channel switching, according to some embodiments. A system including a memory and at least one processor can be configured to perform method 400. Further, any computing device described herein can be configured to perform method 400.

In broad overview of method 400, at block 410, an access point (e.g., block 106 in FIG. 1A) can be communicatively coupled (e.g., by channel switching module 218). At block 420, the AP can transmit (e.g., by transmitter module 220) a first trigger to a first client device. At block 430 and 440, the AP can transmit a second trigger to a second client device. Additional, fewer, or different operations may be performed depending on the particular arrangement. In some arrangements, some, or all operations of method 400 may be performed by one or more processors executing on one or more computing devices, systems, or servers. In various arrangements, each operation may be re-ordered, added, removed, or repeated. In some embodiments, blocks can be optionally executed (e.g., blocks depicted as dotted lined) by the AP. For example, block 430 can be executed without executing block 440, and vice versa. In another example, blocks 430 and 440 may not be executed.

Referring to method 400 in more detail, at block 410, the AP can communicatively couple, by an access point (AP) with one or more client devices, the AP structured to allocate the one or more client device on one of a primary bandwidth channel or a secondary bandwidth channel. In some embodiments, the AP is configured to determine a first network traffic of the first client device. The first network traffic is represented by a first network traffic parameter in some embodiments. A network traffic parameter may refer to a value that represents than amount of data that moves across the network at any given time. In some embodiments, the AP or the client device can be a station device communicating via a networking protocol (e.g., 802.11be protocol), where the station device supports a maximum operating bandwidth. In some embodiments, the station device associated with the AP can operate at a lower bandwidth than the maximum AP operating bandwidth.

At block 420, the AP can transmit a first trigger on at least the primary bandwidth channel to at least a first client device of the one or more client devices based on at least one of (i) a bandwidth availability (ii) a quality of service parameter, or (iii) a secondary bandwidth switching capability, wherein the first client device switches from the primary bandwidth channel to the secondary bandwidth channel in response to the first trigger. In some embodiments, the station device switches from the primary bandwidth channel to operate on the secondary bandwidth channel, wherein the primary bandwidth channel is separate from the secondary bandwidth channel (e.g., the primary channel is in a separate 320 MHz spectrum than the 320 MHz spectrum of the secondary channel). In some embodiments, the station device switches from the primary bandwidth channel to the secondary bandwidth channel after a start of a transmit opportunity, wherein a transmit opportunity indicates when to transmit a first trigger (or a second trigger described below). In some embodiments, the first trigger or the second trigger is a frame sequence, wherein the frame sequence includes sending a buffer status report poll (or another type of response) to the first client device or the second client device. In some embodiments, the first client device is a station (STA) device communicating via a networking protocol, and wherein the STA device supports a maximum operating bandwidth, wherein the STA device operates at a lower bandwidth than a maximum device operating bandwidth, and wherein the STA device switches from the primary bandwidth channel to the secondary bandwidth channel.

At block 430, the AP can transmit a second trigger on at least the primary bandwidth channel to at least a second client device of the one or more client devices based on at least one of (i) the bandwidth availability (ii) the quality of service parameter, or (iii) the secondary bandwidth switching capability, wherein the second client device remains on the primary bandwidth channel in response to the second trigger, wherein the first trigger and the second trigger are contained in a single transmission. In some embodiments, the first client device or the second client device transmits an immediate or a delayed buffer status report in response to the message (e.g., buffer status response poll). In some embodiments, the trigger includes resource unit allocations that lie in the primary bandwidth channel or the secondary bandwidth channel.

At block 440, the AP can transmit a second trigger on at least the secondary bandwidth channel to at least the first client device and on at least the primary bandwidth channel to at least a second client device of the one or more client devices in response to transmitting the first trigger, wherein the second client device remains on the primary bandwidth channel in response to the second trigger, wherein the first trigger and the second trigger are separate transmissions.

In some embodiments, the first trigger or the second trigger is identified by a 1-bit indication, and wherein the 1-bit indication is a field within a frame, and wherein the first trigger or the second trigger includes resource unit (RU) allocations that lie in the primary bandwidth channel or the secondary bandwidth channel, and wherein the at least one processor is further configured to determine the bandwidth availability using a first network traffic parameter for the first client device. In some embodiments channel switching gains are proportional to a ratio of a device bandwidth capability to a non-device bandwidth capability, and wherein the channel switching enables aggregation of streams of multiple non-devices spatially using multi-user multiple-input and multiple-output (MU-MIMO), wherein the device is an access point (AP) and the non-device is a non-AP. In some embodiments, the first client device is the same as the second client device. In some embodiments, the gains approximate or close to equal to the ratio of BW capability. For example, where the AP can transmit at higher SNR over narrower bandwidth, which would reduce the gains of this protocol. Accordingly, gains can increase as the ratio of is increased.

With reference to Protocol 1, both the first trigger and the second trigger can be contained in a single transmission (e.g., BSRP 262). In some embodiments, the first trigger includes an indication of a first channel location for subsequent communication, and wherein the first channel location is different from a second channel location on which at least the first client device of the one or more client devices is currently operating when it receives the indication (e.g., switching from 160P to 160S). In some embodiments, the first channel location is a first resource unit (RU) allocation in the secondary bandwidth channel and the second channel location is a second RU allocation in the primary bandwidth channel, and wherein the first trigger and the second trigger enable the subsequent communication. In some embodiments, the first client device transmits a first response (e.g., on at least the secondary bandwidth channel) in response to receiving a first message in the first trigger, and wherein the second client device transmits a second response (e.g., on at least the primary bandwidth channel) in response to receiving a second message in the second trigger. In some embodiments, at least one of the one or more client devices remain on the primary bandwidth channel and responds to the second trigger, and wherein at least one of the one or more client devices switch to the secondary bandwidth channel and responds to the first trigger.

With reference to Protocol 2, the first trigger and the second trigger can be separate transmissions (e.g., where the first trigger is BSRP 262 and the second trigger is BSRP 264) by the at least one processor, and wherein the separate transmissions is a second protocol, and wherein the at least one processors transmits the second trigger on the primary bandwidth channel and the secondary bandwidth channel in response to transmitting the first trigger. In some embodiments, the at least one processors transmits the second trigger on the primary bandwidth channel and the secondary bandwidth channel without being in response to transmitting the first trigger. In some embodiments, the first trigger includes an indication of a first channel location for subsequent communication, and wherein the first channel location is different from a second channel location on which at least the first client device of the one or more client devices is currently operating when it receives the indication. In some embodiments, the first trigger includes an indication of a first channel location for subsequent communication, and wherein the first channel location is different from a second channel location on which at least the first client device of the one or more client devices is currently operating when it receives the indication. In some embodiments, the first channel location is a first resource unit (RU) allocation in the secondary bandwidth channel and the second channel location is a second RU allocation in the primary bandwidth channel, and wherein the second trigger enables the subsequent communication. In some embodiments, the at least one processor transmits the second trigger on the secondary bandwidth channel to the first client device, and wherein the second trigger includes instructions for the subsequent communication by the first client device and the second client device, and wherein the second trigger requests responses from the first client device on the secondary bandwidth channel and the second client device on the primary bandwidth channel. In some embodiments, the first client device switches from the primary bandwidth channel to the secondary bandwidth channel after the first trigger, and wherein the first trigger is a start of a transmit opportunity, and wherein the second trigger requests responses including the subsequent communication from the first client device on the secondary bandwidth channel and the second client device on the primary bandwidth channel.

B. Computing and Network Environment

Having discussed specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes a wireless communication system that includes one or more access points 106, one or more wireless communication devices 102 and a network hardware component or hardware 192. The wireless communication devices 102 may for example include laptop computers 102, tablets 102, personal computers 102 and/or cellular telephone devices 102. The details of an embodiment of each wireless communication device and/or access point are described in greater detail with reference to FIGS. 1B and 1C. The network environment can be an ad hoc network environment, an infrastructure wireless network environment, a subnet environment, etc. in one embodiment The access points (APs) 106 may be operably coupled (shown as block 410 in FIG. 4) to the network hardware 192 via local area network connections. The network hardware 192, which may include a router, gateway, switch, bridge, modem, system controller, appliance, etc., may provide a local area network connection for the communication system. Each of the access points 106 may have an associated antenna or an antenna array to communicate with the wireless communication devices 102 in its area. The wireless communication devices 102 may register with a particular access point 106 to receive services from the communication system (e.g., via a SU-MIMO or MU-MIMO configuration). For direct connections (e.g., point-to-point communications), some wireless communication devices 102 may communicate directly via an allocated channel and communications protocol. Some of the wireless communication devices 102 may be mobile or relatively static with respect to the access point 106.

In some embodiments an access point 106 includes a device or module (including a combination of hardware and software) that allows wireless communication devices 102 to connect to a wired network using Wi-Fi, or other standards. An access point 106 may sometimes be referred to as an wireless access point (WAP). An access point 106 may be configured, designed and/or built for operating in a wireless local area network (WLAN). An access point 106 may connect to a router (e.g., via a wired network) as a stand-alone device in some embodiments. In other embodiments, an access point can be a component of a router. An access point 106 can provide multiple devices 102 access to a network. An access point 106 may, for example, connect to a wired Ethernet connection and provide wireless connections using radio frequency links for other devices 102 to utilize that wired connection. An access point 106 may be built and/or configured to support a standard for sending and receiving data using one or more radio frequencies. Those standards, and the frequencies they use may be defined by the IEEE (e.g., IEEE 802.11 standards). An access point may be configured and/or used to support public Internet hot-spots, and/or on an internal network to extend the network's Wi-Fi signal range.

In some embodiments, the access points 106 may be used for (e.g., in-home or in-building) wireless networks (e.g., IEEE 802.11, Bluetooth, ZigBee, any other type of radio frequency based network protocol and/or variations thereof). Each of the wireless communication devices 102 may include a built-in radio and/or is coupled to a radio. Such wireless communication devices 102 and/or access points 106 may operate in accordance with the various aspects of the disclosure as presented herein to enhance performance, reduce costs and/or size, and/or enhance broadband applications. Each wireless communication devices 102 may have the capacity to function as a client node seeking access to resources (e.g., data, and connection to networked nodes such as servers) via one or more access points 106.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 1B:
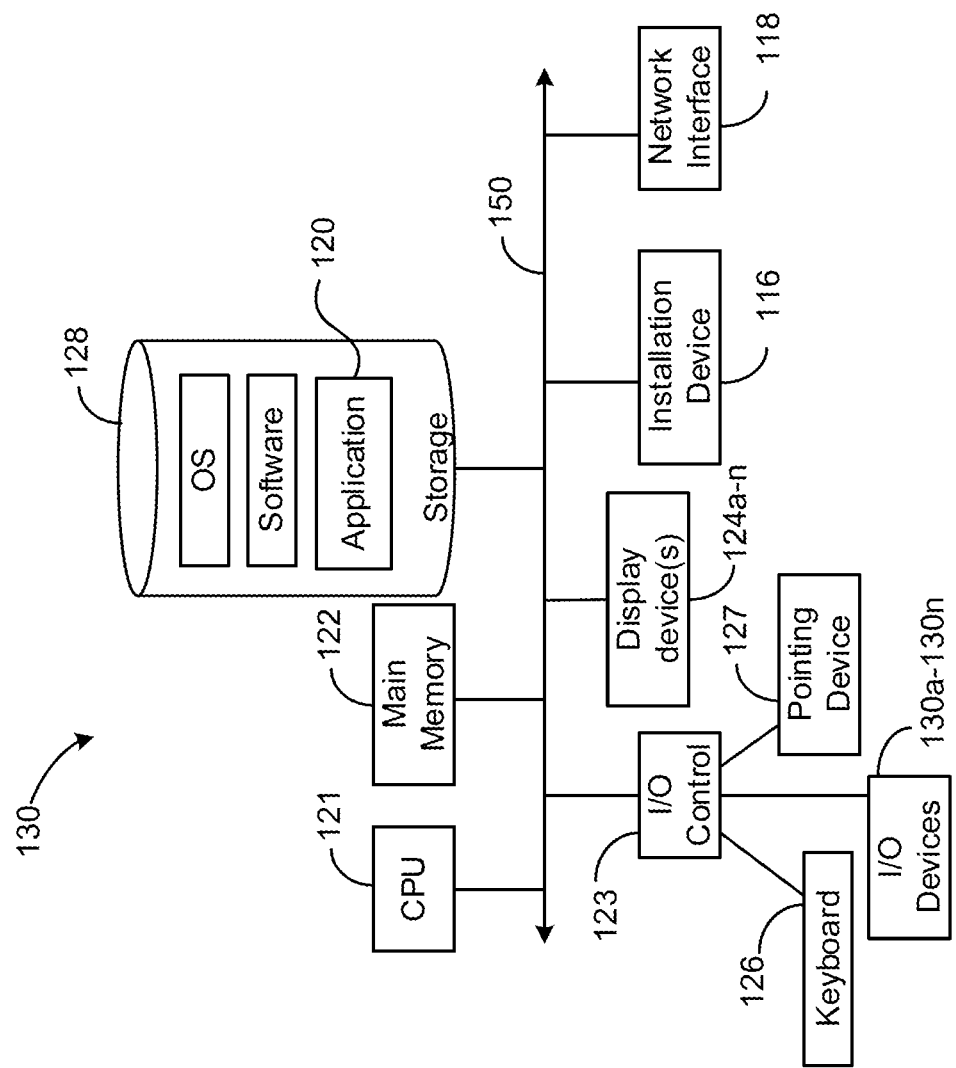
FIGS. 1B and 1C are block diagrams illustrating embodiments of computing devices in connection with the methods and systems described herein, according to some embodiments.
Figure 1C:
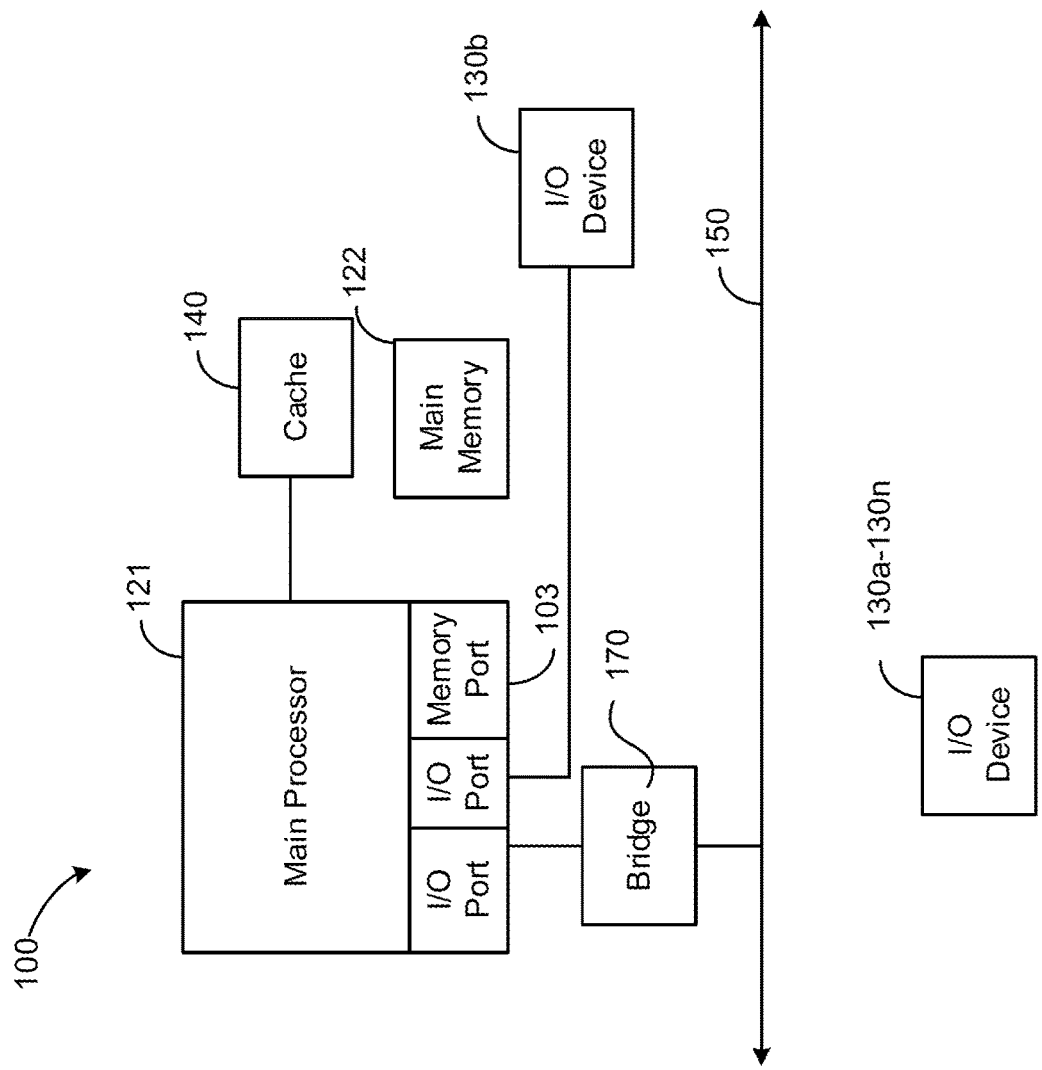

The communications device(s) 102 and access point(s) 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or the access point 106. As shown in FIGS. 1B and 1C, each computing device 100 includes a central processing unit or processor 121, and a main memory 122. As shown in FIG. 1B, a computing device 100 may include a storage device 128, an installation device 116, a network interface 118, an I/O controller 123, display devices 124a-124n, a keyboard 126 and a pointing device 127, such as a mouse. The storage device 128 may include, without limitation, an operating system and/or software. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit or processor 121.

The central processing unit or processor 121 is any logic circuitry that responds to and processes instructions fetched from the main memory 122. In many embodiments, the central processing unit or processor 121 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 100 may be based on any of these processors, or any other processor capable of operating as described herein.

Main memory 122 may be one or more memory chips capable of storing data and allowing any storage location to be directly accessed by the microprocessor or processor 121, such as any type or variant of Static random access memory (SRAM), Dynamic random access memory (DRAM), Ferroelectric RAM (FRAM), NAND Flash, NOR Flash and Solid State Drives (SSD). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which processor 121 (e.g., the main processor) communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is provided by, for example, SRAM, BSRAM, or EDRAM. In the embodiment shown in FIG. 1C, the processor 121 communicates with various I/O devices 130 via a local or system bus 150. Various buses may be used to connect the central processing unit or processor 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display or display device 124, the processor 121 may use an Advanced Graphics Port (AGP) to communicate with the display device 124. FIG. 1C depicts an embodiment of a computer 100 in which the main processor 121 may communicate directly with I/O device 130*b*, for example via HYPERTRANSPORT, RAPIDIO, or INFINIBAND communications technology. FIG. 1C also depicts an embodiment in which local busses and direct communication are mixed: the processor 121 communicates with I/O device 130*a* using a local interconnect bus while communicating with I/O device 130*b* directly.

A wide variety of I/O devices 130*a*-130*n* may be present in the computing device 100. Input devices include keyboards, mice, trackpads, trackballs, microphones, dials, touch pads, touch screen, and drawing tablets. Output devices include video displays, speakers, inkjet printers, laser printers, projectors, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium or device 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, California.

Referring again to FIG. 1B, the computing device 100 may support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 may further include a storage device, such as one or more hard disk drives or redundant arrays of independent disks, for storing an operating system and other related software, and for storing application software programs such as any program or software 120 for implementing (e.g., configured and/or designed for) the systems and methods described herein. Optionally, any of the installation devices 116 could also be used as the storage device. Additionally, the operating system and the software can be run from a bootable medium.

Furthermore, the computing device 100 may include a network interface 118 to interface to the network 104 through a variety of connections including, but not limited to, standard telephone lines, LAN, or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.1 lad, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 may include a built-in network adapter, network interface card, PCMCIA network card, card bus network adapter, wireless network adapter, USB network adapter, modem, or any other device suitable for interfacing the computing device 100 to any type of network capable of communication and performing the operations described herein.

In some embodiments, the computing device 100 may include or be connected to one or more display devices 124*a*-124*n*. As such, any of the I/O devices 130*a*-130*n* and/or the I/O controller 123 may include any type and/or form of suitable hardware, software, or combination of hardware and software to support, enable or provide for the connection and use of the display device(s) 124*a*-124*n* by the computing device 100. For example, the computing device 100 may include any type and/or form of video adapter, video card, driver, and/or library to interface, communicate, connect, or otherwise use the display device(s) 124*a*-124*n*. In one embodiment, a video adapter may include multiple connectors to interface to the display device(s) 124*a*-124*n*. In other embodiments, the computing device 100 may include multiple video adapters, with each video adapter connected to the display device(s) 124*a*-124*n*. In some embodiments, any portion of the operating system of the computing device 100 may be configured for using multiple displays or display devices 124*a*-124*n*. One ordinarily skilled in the art will recognize and appreciate the various ways and embodiments that a computing device 100 may be configured to have one or more display devices 124*a*-124*n*.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 100 of the sort depicted in FIGS. 1B and 1C may operate under the control of an operating system, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein.

In some embodiments, the computing device 100 may have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to a standard (e.g., 802.11 or another networking standard), it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C #, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in port or destination quantity, data types, methods of reinsertion, reintroduction, etc., values of parameters, arrangements, etc.). For example, the position of elements may be reversed or otherwise varied, the connections between elements may be direct or indirect, such that there may be one or more intermediate elements connected in between, and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions, and arrangement of the exemplary embodiments without departing from the scope of the present disclosure. For example, the embodiments of the present disclosure may be implemented by a single device and/or system or implemented by a combination of separate devices and/or systems.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer (e.g., ASICs or FPGAs) or any other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

When an element is referred to herein as being "communicatively couple" or "coupling", or "communicatively coupling" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

Furthermore, the methods and processes discussed herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth used should be understood as being modifiable. In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

What is claimed is:

1. A device for channel switching, comprising:
   a memory; and
   at least one processor configured to:
   communicatively coupled with one or more client devices, using one of a primary bandwidth channel or a secondary bandwidth channel;
   transmit a first trigger on at least the primary bandwidth channel to at least a first client device of the one or more client devices based on at least one of (i) a bandwidth availability (ii) a quality of service parameter, or (iii) a secondary bandwidth switching capability, wherein the first client device switches from the primary bandwidth channel to the secondary bandwidth channel in response to the first trigger; and
   transmit a second trigger on at least the primary bandwidth channel to at least a second client device of the one or more client devices based on at least one of (i) the bandwidth availability (ii) the quality of service parameter, or (iii) the secondary bandwidth switching capability, wherein the second client device remains on the primary bandwidth channel in response to the second trigger, wherein the first trigger and the second trigger are contained in a single transmission.

2. The device of claim 1, wherein the first trigger comprises an indication of a first channel location for subsequent communication, and wherein the first channel location is different from a second channel location on which at least the first client device of the one or more client devices is currently operating when it receives the indication.

3. The device of claim 2, wherein the first channel location is a first resource unit (RU) allocation in the secondary bandwidth channel, and wherein the first trigger and the second trigger enable the subsequent communication.

4. The device of claim 1, wherein the first client device transmits a first response on at least the secondary bandwidth channel in response to receiving a first message in the first trigger, and wherein the second client device transmits a second response on at least the primary bandwidth channel in response to receiving a second message in the second trigger.

5. The device of claim 1, wherein the first trigger indicates a start of a transmit opportunity, and wherein during the transmit opportunity the first client device remains on the secondary bandwidth channel and the second client device remains on the primary bandwidth channel.

6. The device of claim 1, wherein the first client device is a station (STA) device communicating via a networking protocol, and wherein the STA device supports a maximum operating bandwidth, and wherein the STA device operates at a lower bandwidth than a maximum device operating bandwidth, and wherein the STA device switches from the primary bandwidth channel to the secondary bandwidth channel, and wherein a plurality of transmissions on each of the primary bandwidth channel and the secondary bandwidth channel are within short interframe spaces (SIFSs) of each other.

7. The device of claim 1, wherein the first trigger is identified by a 1-bit indication, and wherein the 1-bit indication is a field within a frame, and wherein the first trigger comprises resource unit (RU) allocations, and wherein the at least one processor is further configured to determine the bandwidth availability using a first network traffic parameter for the first client device.

8. The device of claim 1, wherein:
   channel switching enables aggregation of streams of multiple non-devices spatially using multi-user multiple-input and multiple-output (MU-MIMO), wherein the device is an access point (AP) and the non-device is a non-AP; and
   during a transmit opportunity following the first client device switching from the primary bandwidth channel to the secondary bandwidth channel in response to the first trigger, any subsequent transmissions from the first client device occurs in response to another trigger or request from the at least one processor.

9. A device for channel switching, comprising:
   a memory; and
   at least one processor configured to:
   communicatively coupled with one or more client devices, using one of a primary bandwidth channel or a secondary bandwidth channel;
   transmit a first trigger on at least the primary bandwidth channel to at least a first client device of the one or more client devices based on at least one of (i) a bandwidth availability (ii) a quality of service parameter, or (iii) a secondary bandwidth switching capability, wherein the first client device switches from the primary bandwidth channel to the secondary bandwidth channel in response to the first trigger; and
   transmit a second trigger on at least the secondary bandwidth channel to at least the first client device and on at least the primary bandwidth channel to at least a second client device of the one or more client devices in response to transmitting the first trigger, wherein the second client device remains on the primary bandwidth channel in response to the second trigger, wherein the first trigger and the second trigger are separate transmissions.

10. The device of claim 9, wherein the at least one processor is further configured to:
transmit a second trigger on at least the primary bandwidth channel to at least a third client device of the one or more client devices based on at least one of (i) the bandwidth availability (ii) the quality of service parameter, or (iii) the secondary bandwidth switching capability, wherein the third client device remains on the primary bandwidth channel in response to the second trigger, wherein the first trigger and the second trigger are contained in a single transmission.

11. The device of claim 9, wherein the first trigger comprises an indication of a first channel location for subsequent communication, and wherein the first channel location is different from a second channel location on which at least the first client device of the one or more client devices is currently operating when it receives the indication.

12. The device of claim 11, wherein the first channel location is a first resource unit (RU) allocation in the secondary bandwidth channel, and wherein the second trigger enables the subsequent communication.

13. The device of claim 9, wherein the second trigger comprises instructions for a subsequent communication by the first client device and the second client device, and wherein the second trigger requests responses from the first client device on the secondary bandwidth channel and the second client device on the primary bandwidth channel.

14. The device of claim 9, wherein the first trigger is a start of a transmit opportunity, and wherein during the transmit opportunity the first client device remains on the secondary bandwidth channel and the second client device remains on the primary bandwidth channel.

15. A device comprising:
a network interface configured to establish connections with one or more client devices; and
a channel switching unit configured to communicatively couple with the one or more client devices, using one of a primary bandwidth channel or a secondary bandwidth channel; and
a transmitter configured to:
transmit a first trigger on at least the primary bandwidth channel to at least a first client device of the one or more client devices based on at least one of (i) a bandwidth availability (ii) a quality of service parameter, or (iii) a secondary bandwidth switching capability, wherein the first client device switches from the primary bandwidth channel to the secondary bandwidth channel in response to the first trigger; and is further configured to transmit at least one of:
a second trigger on at least the primary bandwidth channel to at least a second client device of the one or more client devices based on at least one of (i) the bandwidth availability (ii) the quality of service parameter, or (iii) the secondary bandwidth switching capability, wherein the second client device remains on the primary bandwidth channel in response to the second trigger, wherein the first trigger and the second trigger are contained in a single transmission; or
transmit a second trigger on at least the secondary bandwidth channel to at least the first client device and on at least the primary bandwidth channel to at least a third client device of the one or more client devices in response to transmitting the first trigger, wherein the third client device remains on the primary bandwidth channel in response to the second trigger, wherein the first trigger and the second trigger are separate transmissions.

16. The device of claim 15, wherein the transmitter is further configured to:
transmit the second trigger on at least the primary bandwidth channel to at least the second client device of the one or more client devices based on at least one of (i) the bandwidth availability (ii) the quality of service parameter, or (iii) the secondary bandwidth switching capability, wherein the second client device remains on the primary bandwidth channel in response to the second trigger, wherein the first trigger and the second trigger are contained in a single transmission.

17. The device of claim 15, wherein the transmitter is further configured to:
transmit the second trigger on at least the secondary bandwidth channel to at least the first client device and on at least the primary bandwidth channel to at least the third client device of the one or more client devices in response to transmitting the first trigger, wherein the third client device remains on the primary bandwidth channel in response to the second trigger, wherein the first trigger and the second trigger are separate transmissions.

18. A method of channel switching comprising:
communicatively coupling, by an access point (AP), with one or more client devices, using one of a primary bandwidth channel or a secondary bandwidth channel;
transmitting, by the AP, a first trigger on at least the primary bandwidth channel to at least a first client device of the one or more client devices based on at least one of (i) a bandwidth availability (ii) a quality of service parameter, or (iii) a secondary bandwidth switching capability, wherein the first client device switches from the primary bandwidth channel to the secondary bandwidth channel in response to the first trigger; and
transmitting by the AP at least one of:
a second trigger on at least the primary bandwidth channel to at least a second client device of the one or more client devices based on at least one of (i) the bandwidth availability (ii) the quality of service parameter, or (iii) the secondary bandwidth switching capability, wherein the second client device remains on the primary bandwidth channel in response to the second trigger, wherein the first trigger and the second trigger are contained in a single transmission; or
a second trigger on at least the secondary bandwidth channel to at least the first client device and on at least the primary bandwidth channel to at least a third client device of the one or more client devices in response to transmitting the first trigger, wherein the third client device remains on the primary bandwidth channel in response to the second trigger, wherein the first trigger and the second trigger are separate transmissions.

19. The method of claim 18, further comprising:
transmitting, by the AP, the second trigger on at least the primary bandwidth channel to at least the second client device of the one or more client devices based on at least one of (i) the bandwidth availability (ii) the quality of service parameter, or (iii) the secondary bandwidth switching capability, wherein the second client device remains on the primary bandwidth channel in response to the second trigger, wherein the first trigger and the second trigger are contained in a single transmission.

20. The method of claim 18, further comprising:
transmitting, by the AP, a second trigger on at least the secondary bandwidth channel to at least the first client device and on at least the primary bandwidth channel to at least the third client device of the one or more client devices in response to transmitting the first trigger, wherein the third client device remains on the primary bandwidth channel in response to the second trigger, wherein the first trigger and the second trigger are separate transmissions.

* * * * *